United States Patent
Watanabe et al.

(10) Patent No.: US 9,348,012 B2
(45) Date of Patent: May 24, 2016

(54) VEHICLE INCLINATION DETECTING DEVICE

(75) Inventors: Masahiro Watanabe, Tokyo (JP);
Wataru Tsujita, Tokyo (JP); Kenji Inomata, Tokyo (JP); Takashi Ohsawa, Tokyo (JP); Masahiro Shikai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 361 days.

(21) Appl. No.: 13/980,152

(22) PCT Filed: Mar. 16, 2012

(86) PCT No.: PCT/JP2012/001863
§ 371 (c)(1),
(2), (4) Date: Jul. 17, 2013

(87) PCT Pub. No.: WO2012/124352
PCT Pub. Date: Sep. 20, 2012

(65) Prior Publication Data
US 2013/0300609 A1    Nov. 14, 2013

(30) Foreign Application Priority Data

Mar. 17, 2011 (JP) .................................. 2011-059247
Dec. 16, 2011 (JP) ..................... PCT/JP2011/007047

(51) Int. Cl.
| | | |
|---|---|---|
| G01S 5/02 | (2010.01) | |
| G01C 9/00 | (2006.01) | |
| G01S 15/10 | (2006.01) | |
| G01S 15/87 | (2006.01) | |

(52) U.S. Cl.
CPC .................. *G01S 5/0273* (2013.01); *G01C 9/00* (2013.01); *G01S 15/102* (2013.01); *G01S 15/872* (2013.01)

(58) Field of Classification Search
CPC ....... G01C 9/00; G01S 15/102; G01S 15/872; G01S 5/027
USPC ...................................... 342/70–72
See application file for complete search history.

(56) References Cited

U.S. PATENT DOCUMENTS

| | | | |
|---|---|---|---|
| 5,933,112 A | 8/1999 | Hiramatsu et al. | |
| 2003/0154792 A1 | 8/2003 | Katayama | |

FOREIGN PATENT DOCUMENTS

| | | |
|---|---|---|
| JP | 8 201498 | 8/1996 |
| JP | 9 203634 | 8/1997 |
| JP | 11 46113 | 2/1999 |
| JP | 11 271435 | 10/1999 |
| JP | 2003 127757 | 5/2003 |

(Continued)

OTHER PUBLICATIONS

International Search Report Issue Jun. 19, 2012 in PCT/JP12/001863 Filed Mar. 16, 2012.

*Primary Examiner* — Timothy A Brainard
(74) *Attorney, Agent, or Firm* — Oblon, McClelland, Maier & Neustadt, L.L.P.

(57) ABSTRACT

In a vehicle inclination detecting device, a receiving unit includes a switching unit for alternately switching between a received signal from a first receiving antenna and a received signal from a second receiving antenna to alternately output the received signals to an orthogonal detector. The orthogonal detector carries out orthogonal detection on each of the two received signals from the switching unit and an oscillating signal from an oscillator by using an identical line.

8 Claims, 24 Drawing Sheets

(56) References Cited

FOREIGN PATENT DOCUMENTS

| | | | |
|---|---|---|---|
| JP | 2003 307420 | 10/2003 | |
| JP | 2005 189101 | 7/2005 | |
| JP | 2006 290005 | 10/2006 | |
| JP | 2009 282022 | 12/2009 | |
| JP | 2009282022 A | * 12/2009 | |
| JP | 2011 12984 | 1/2011 | |

* cited by examiner (a)

(b)

VEHICLE INCLINATION DETECTING DEVICE

FIELD OF THE INVENTION

The present invention relates to a vehicle inclination detecting device for automatically detecting the angle of inclination of a vehicle, such as a car. Particularly, this vehicle inclination detecting device is suitable for use in a system that automatically carries out optical axis control of headlights for vehicle.

BACKGROUND OF THE INVENTION

As a conventional vehicle inclination detecting device, for example, there is a device shown in patent reference 1. An ultrasonic wave transmitting unit transmits an ultrasonic wave toward a ground surface (road surface). The vehicle inclination detecting device receives the ultrasonic wave reflected from the ground surface by using ultrasonic receiving units disposed at different positions. The vehicle inclination detecting device measures the time that elapses from the transmission to the reception, and computes the difference between the receiving times of the ultrasonic reception units or the phase difference between the ultrasonic waves received by the ultrasonic receiving units to detect the angle of inclination of a vehicle.

Further, as a conventional vehicle inclination detecting device, for example, there is a device shown in patent reference 2. A radio wave transmitting unit emits a radio wave toward a ground surface, and a radio wave receiving unit receives the radio wave reflected from a road surface by using two receiving antennas. A computing unit computes the phase difference between the two received signals by carrying out a combining process, and detects the angle of inclination of a vehicle.

Further, as a conventional vehicle inclination detecting device, for example, there is a device shown in patent reference 3. Two ultrasonic transmission and reception sensors are disposed in a longitudinal direction of a vehicle. An ultrasonic wave transmitting unit transmits an ultrasonic wave toward a ground surface. The vehicle inclination detecting device receives the ultrasonic wave reflected from the ground surface by using an ultrasonic receiving unit, and measures the time that elapses from the transmission to the reception. The vehicle inclination detecting device detects the angle of inclination of the vehicle from the mount space in a longitudinal direction between the ultrasonic transmission and reception sensors, the difference between the receiving times of the ultrasonic transmission and reception sensors or the phase difference between the ultrasonic waves received by the ultrasonic transmission and reception sensors, and the difference between the levels of the two ultrasonic transmission and reception sensors. The vehicle inclination detecting device determines whether the vehicle is in either a travelling state or an idle state from the vehicle speed measured by a speed sensor, and carries out an averaging process by using the angle of inclination which the vehicle inclination detecting device computes while the vehicle is travelling on a priority basis to output an average of the angle of inclination.

Further, as a conventional vehicle inclination detecting device, for example, there is a device shown in patent reference 4. A radio wave transmitting unit emits a radio wave toward a ground surface, and a radio wave receiving unit receives the radio wave reflected from the road surface by using two receiving antennas. The vehicle inclination detecting device carries out orthogonal detection on each of the received signals and the transmission signal to acquire their respective baseband signals. The vehicle inclination detecting device then derives a phase difference to detect the angle of inclination of a vehicle by carrying out an arithmetic process on the basis of the amplitude and the phase of each of these baseband signals.

RELATED ART DOCUMENT

Patent reference

Patent reference 1: Japanese Unexamined Patent Application Publication No. 2003-307420
Patent reference 2: Japanese Unexamined Patent Application Publication No. 2005-189101
Patent reference 3: Japanese Unexamined Patent Application Publication No. 2003-127757
Patent reference 4: Japanese Unexamined Patent Application Publication No. 2009-282022

SUMMARY OF THE INVENTION

Problems to be Solved by the Invention

Because the conventional vehicle inclination detecting device described in patent reference 1 is constructed as above, a problem is that the conventional vehicle inclination detecting device is affected by a temperature change, winds, and noise and hence the phase difference varies, and therefore the conventional vehicle inclination detecting device cannot detect the angle of inclination of the vehicle with a high degree of accuracy.

Further, because the conventional vehicle inclination detecting device described in patent reference 2 is constructed as above, a problem is that the conventional vehicle inclination detecting device is affected by a variation in each of the levels of the two received signals received by the two different receiving antennas and hence the computed phase difference varies, and therefore the conventional vehicle inclination detecting device cannot detect the angle of inclination of the vehicle with a high degree of accuracy.

Further, because the conventional vehicle inclination detecting device described in patent reference 3 is constructed as above, a problem is that the conventional vehicle inclination detecting device may carry out erroneous decision due to measurement errors occurring in the speed sensor which are caused by wheel slipping and skidding, and therefore the conventional vehicle inclination detecting device cannot detect the angle of inclination of the vehicle with a high degree of accuracy. A further problem is that wiring between the speed sensor and the vehicle inclination detecting device is needed, and hence the space saving and the wire saving cannot be achieved. Another problem is that because the vehicle inclination detecting device can determine only a travel and a stop of the vehicle, while the vehicle inclination detecting device cannot detect any sudden change in the flatness which locally occurs on the road surface, such as a joint of a road through which the vehicle passes when the vehicle is travelling a highway, or a railroad crossing, the vehicle inclination detecting device cannot detect the angle of inclination of the vehicle with a high degree of accuracy even if the vehicle inclination detecting device carries out the averaging process.

Further, because the conventional vehicle inclination detecting device described in patent reference 4 is constructed as above, a problem is that because an error occurs due to variations in the characteristics of each orthogonal detector, such as variations in the amplitude and the phase of each of the two baseband signals acquired by the orthogonal detectors, and hence the phase difference based on the two baseband signals is not outputted correctly, the vehicle inclination detecting device cannot detect the angle of inclination of the vehicle with a high degree of accuracy. Another problem is that when the orthogonal detectors respectively connected to the two receiving antennas don't have good linearity characteristics as their phase characteristics, the phase difference is not correct because the phase value of each of the two baseband signals is not outputted correctly, and therefore the vehicle inclination detecting device cannot detect the angle of inclination of the vehicle with a high degree of accuracy. A further problem is that because the phase difference based on the two baseband signals includes a phase difference caused by a single reflection and a phase difference caused by two or more reflections when the radio wave reflected from the ground surface is emitted again (reflected) from a vehicle body including the radio wave transmitting unit and the two receiving antennas receive the radio wave reflected from the road surface again, the vehicle inclination detecting device cannot detect the angle of inclination of the vehicle with a high degree of accuracy.

The present invention is made in order to solve the above-mentioned problems, and it is therefore an object of the present invention to provide a vehicle inclination detecting device that can detect the angle of inclination of a vehicle with a high degree of accuracy even if a temperature change occurs, a wind is blowing, or noise occurs.

It is another object of the present invention to provide a vehicle inclination detecting device that can detect the angle of inclination of a vehicle with a high degree of accuracy even if there is a variation in a received signal level.

It is a further object of the present invention to provide a vehicle inclination detecting device that can detect the angle of inclination of a vehicle with a high degree of accuracy without using a speed sensor.

It is a still further object of the present invention to provide a vehicle inclination detecting device that can detect the angle of inclination of a vehicle with a high degree of accuracy even if a road along which the vehicle is travelling has a surface having an uneven portion locally.

It is another object of the present invention to provide a vehicle inclination detecting device that can eliminate errors occurring due to a variation in the characteristics of each orthogonal detector, thereby being able to detect the angle of inclination of a vehicle with a high degree of accuracy.

It is a further object of the present invention to provide a vehicle inclination detecting device that can detect the angle of inclination of a vehicle with a high degree of accuracy even when orthogonal detectors respectively connected to two receiving antennas don't have good linearity characteristics as their phase characteristics.

It is a still further object of the present invention to provide a vehicle inclination detecting device that can detect the angle of inclination of a vehicle with a high degree of accuracy even if a plurality of reflection waves are reflected from a road surface.

Means for Solving the Problem

In accordance with the present invention, there is provided a vehicle inclination detecting device including: a transmitting unit disposed in a vehicle, for emitting an oscillating signal having a predetermined frequency as a radio wave from a transmitting antenna; a switching unit for alternately switching between a first received signal which a first receiving antenna acquires by receiving the radio wave reflected from a ground surface and a second received signal which a second receiving antenna acquires by receiving the radio wave reflected from the ground surface to alternately output the first received signal and the second received signal onto a single first line; an orthogonal detection unit for carrying out orthogonal detection on both the first received signal or the second received signal, which is sent thereto from the switching unit by way of the single first line, and the oscillating signal to acquire a first amplitude value and a first phase value or a second amplitude value and a second phase value, and for alternately switching between the first amplitude and phase values and the second amplitude and phase values to alternately output the first amplitude and phase values and the second amplitude and phase values onto a single second line; and an angle of inclination arithmetic unit for computing the angle of inclination of the vehicle with respect to the ground surface on the basis of the first amplitude and phase values and the second amplitude and phase values which are sent thereto from the orthogonal detection unit by way of the single second line.

In accordance with the present invention, there is provided a vehicle inclination detecting device including: a transmitting unit disposed in a vehicle, for emitting a transmission signal which is acquired by rotating a phase of an oscillating signal having a predetermined frequency as a radio wave from an transmitting antenna; a first switching unit for switching between a first received signal which a first receiving antenna acquires by receiving the radio wave reflected from a ground surface and the transmission signal which the first switching unit acquires from the transmitting unit to alternately output the first received signal and the transmission signal; a second switching unit for switching between a second received signal which a first receiving antenna acquires by receiving the radio wave reflected from the ground surface and the transmission signal which the second switching unit acquires from the transmitting unit to alternately output the second received signal and the transmission signal; a receiving unit for getting a first amplitude value and a first phase value which a first orthogonal detection unit acquires by carrying out orthogonal detection on the first received signal from the first switching unit and the oscillating signal, and a second amplitude value and a second phase value which a second orthogonal detection unit acquires by carrying out orthogonal detection on the second received signal from the second switching unit and the oscillating signal, and for getting a third amplitude value and a third phase value which the first orthogonal detection unit acquires by carrying out orthogonal detection on the transmission signal from the first switching unit and the oscillating signal, and a fourth amplitude value and a fourth phase value which the second orthogonal detection unit acquires by carrying out orthogonal detection on the transmission signal from the second switching unit and the oscillating signal; and an angle of inclination arithmetic unit for referring to both phase rotation linearity characteristics of the first orthogonal detection unit which are computed from the third amplitude value and the third phase value, and phase rotation linearity characteristics of the second orthogonal detection unit which are computed from the fourth amplitude value and the fourth phase value to compute the angle of inclination of the vehicle with respect to the ground surface on the basis of the first amplitude value and the first phase value and the second amplitude value and the second phase value.

In accordance with the present invention, there is provided a vehicle inclination detecting device including: a transmitting unit disposed in a vehicle, for carrying out pulse modulation on an oscillating signal having a predetermined frequency to emit the oscillating signal as a radio wave from a transmitting antenna; a receiving unit for getting a first amplitude value and a first phase value which a first orthogonal detection unit acquires by carrying out orthogonal detection on a first pulse received signal which a first receiving antenna acquires by receiving the radio wave reflected from a ground surface and the oscillating signal, and a second amplitude value and a second phase value which a second orthogonal detection unit acquires by carrying out orthogonal detection on a second pulse received signal which a second receiving antenna acquires by receiving the radio wave reflected from the ground surface and the oscillating signal; and an angle of inclination arithmetic unit for computing the angle of inclination of the vehicle with respect to the ground surface on the basis of both a value which is acquired by sampling the first amplitude and phase values and a value which is acquired by sampling the second amplitude and phase values.

Advantages of the Invention

According to the present invention, there is provided an advantage of being able to detect a variation in the radio wave propagation distance which varies according to the inclination of the vehicle as a variation in the phase with a high degree of accuracy, and therefore compute the vehicle inclination angle with a high degree of accuracy. There is provided another advantage of being able to detect the angle of inclination of the vehicle with a high degree of accuracy even if a temperature change occurs or a wind is blowing. There is provided a further advantage of being able to detect the angle of inclination of the vehicle with a high degree of accuracy without being affected by engine noise or the like. Further, because the vehicle inclination detecting device computes the angle of inclination of the vehicle from the phase difference between IQ signals which are acquired through the orthogonal detection even if the difference between the received signal levels varies, there is provided an advantage of being able to detect the angle of inclination of the vehicle with a high degree of accuracy.

Further, because the vehicle inclination detecting device alternately switches between the received signals from the two receiving antennas to carry out orthogonal detection on the oscillating signal and each of the received signals by using the single orthogonal detector, the vehicle inclination detecting device can prevent an error from occurring due to a variation in the characteristics of each orthogonal detector, such as variations in the amplitude and the phase of each signal acquired by each orthogonal detector, and can determine the angle of inclination with a high degree of accuracy.

Further, because the vehicle inclination detecting device inputs the transmission signal which is the oscillating signal from the oscillator whose phase is rotated directly to the orthogonal detector as a signal equivalent to a received signal and acquires the phase characteristics of an IQ signal which is acquired through this orthogonal detection, as its self-calibration function, the vehicle inclination detecting device can correct the phase rotation linearity characteristics of the orthogonal detector even if the phase rotation linearity characteristics of the orthogonal detector are not good, and can determine the angle of inclination of the vehicle with a high degree of accuracy.

In addition, because the vehicle inclination detecting device carries out pulse modulation on the transmission signal, and samples pulse-modulated IQ signals which are acquired by carrying out orthogonal detection on each of two pulse-modulated received signals from the two receiving antennas in time sequence, the vehicle inclination detecting device can separate the phase values of IQ signals acquired from a one-time reflection from a ground surface from the phase values of IQ signals acquired from multiple reflections on a time axis, and can therefore determine the angle of inclination of the vehicle with a high degree of accuracy by carrying out a process of computing a phase difference from the phase values of the one-time reflected components.

EMBODIMENTS OF THE INVENTION

Hereafter, in order to explain this invention in greater detail, the preferred embodiments of the present invention will be described with reference to the accompanying drawings.

Embodiment 1.

Figure 1:
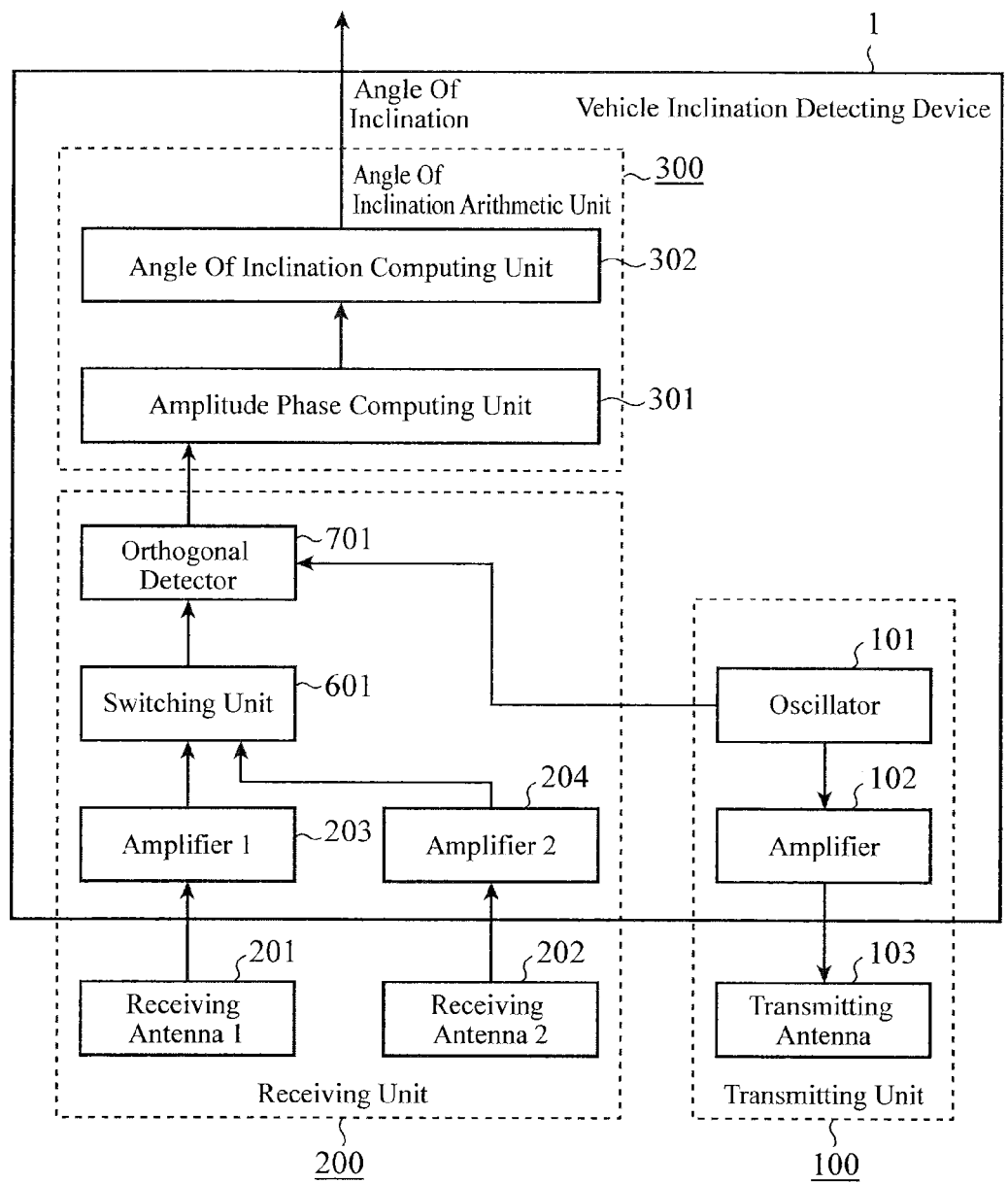
FIG. 1 is a block diagram of a vehicle inclination detecting device in accordance with Embodiment 1 of the present invention.

FIG. 1 is a block diagram showing the structure of a vehicle inclination detecting device 1 in accordance with Embodiment 1 of the present invention. The vehicle inclination detecting device 1 that detects the angle of inclination of a vehicle is provided with a transmitting unit 100, a receiving unit 200, and an angle of inclination arithmetic unit 300. The transmitting unit 100 includes an oscillator 101, an amplifier 102, and a transmitting antenna 103. The receiving unit 200 includes a first receiving antenna 201, a second receiving antenna 202, a first amplifier 203, a second amplifier 204, a switching unit 601, and an orthogonal detector 701. The angle of inclination arithmetic unit 300 includes an amplitude phase computing unit 301 and an angle of inclination computing unit 302.

The transmitting antenna 103, the first receiving antenna 201, and the second receiving antenna 202 can be arranged in an arbitrary way in which, for example, they are aligned in a straight line or arranged at the vertices of a triangle, respectively. Further, the transmitting antenna 103, the first receiving antenna 201, and the second receiving antenna 202 can be arranged in an arbitrary way in which, for example, they are arranged at the same level or at different levels. In addition, the space A between the transmitting antenna 103 and the first receiving antenna 201, and the space B between the transmitting antenna 103 and the second receiving antenna 202 can have either one of the following relationships: they are the same as each other, and they are not the same as each other.

Next, the operation of the vehicle inclination detecting device will be explained. The transmitting unit 100 inputs a transmission signal having a predetermined frequency, a predetermined amplitude, and a predetermined phase to the transmitting antenna 103 from the oscillator 101 by way of the amplifier 102. The transmission signal inputted to the transmitting antenna 103 is emitted as a radio wave. The transmission signal can have a frequency band of 24 GHz or a frequency band of 24-29 GHz. For example, in order to adapt to the frequency bands approved by the Japanese Radio Wave Laws, the 24 GHz band (24.05-24.25 GHz) for use in specified low power radio stations or the 26 GHz band (24.25-29.0 GHz) for use in ultrawideband radars can be used.

The receiving unit 200 receives the radio wave by way of the first receiving antenna 201 and the second receiving antenna 202 to acquire a first received signal and a second received signal. The received signals are inputted to the switching unit 601 by way of the first and second amplifiers 203 and 204. The switching unit alternately switches between the received signals to alternately output the received signals to the orthogonal detector 701. The orthogonal detector 701 computes the amplitude value and the phase value of each of the first and second received signals, and outputs the amplitude value and the phase value to the angle of inclination arithmetic unit 300. Because a single line is provided between the switching unit 601 and the orthogonal detector 701, the phase length through which the first received signal passes is made to be the same as that through which the second received signal passes in the line from the switching unit 601 to the orthogonal detector 701. Further, by carrying out the orthogonal detection using the single orthogonal detector, the vehicle inclination detecting device prevents an error from occurring due to a variation in the characteristics of each orthogonal detector, such as variations in the amplitude and the phase of each signal acquired by each orthogonal detector.

The angle of inclination arithmetic unit 300 computes the angle of inclination of the vehicle from the amplitude values and the phase values.

More concretely, the oscillator 101 in the transmitting unit 100 outputs a signal having a preset frequency, a preset amplitude, and a preset phase to the amplifier 102 as the transmission signal. The amplifier 102 carries out power amplification on the transmission signal up to a predetermined level, and outputs the transmission signal amplified thereby to the transmitting antenna 103. The transmitting antenna 103 emits the transmission signal into space as a radio wave. As the transmitting antenna 103, any type of antenna, such as a directional antenna, an array antenna, a horn antenna, or a patch antenna, can be used. Further, the radio wave emitted from the transmitting antenna can be any type of radio wave, such as a vertically polarized wave, a horizontally polarized wave, or a circularly polarized wave.

The radio wave emitted from the transmitting antenna is reflected from a ground surface, and is received by the first receiving antenna 201 and the second receiving antenna 202 mounted at different positions in the receiving unit 200 and signals received by the first and second receiving antennas are outputted as the first received signal and the second received signal. As each of the receiving antennas, any type of antenna, such as a directional antenna, an array antenna, a horn antenna, or a patch antenna, can be used.

The first amplifier 203 in the first receiving antenna 201 carries out power amplification on the first received signal up to a predetermined level, and outputs the first received signal amplified thereby to the orthogonal detector 701 by way of the switching unit 601. The second amplifier 204 outputs the second received signal to the orthogonal detector 701 by way of the switching unit 601. The orthogonal detector 701 carries out orthogonal detection (IQ detection) on either the first received signal or the second received signal by using the oscillating signal from the oscillator 101 as a reference signal, and outputs an IQ signal to the amplitude phase computing unit 301.

The IQ signal consists of two signals: an I signal acquired from a 0-degree component of the reference signal, and a Q signal acquired from a 90-degree component of the reference signal. The arc tangent of the I signal and the Q signal corresponds to the phase difference between the first received signal and the second received signal. The root sum square value of the I signal and the Q signal corresponds to the product of the amplitude of the first received signal and that of the second received signal. The amplitude phase computing unit 301 in the angle of inclination arithmetic unit 300 derives the phase difference between the two received signals from the IQ signal (first IQ signal) of the first received signal and the IQ signal (second IQ signal) of the second received signal which the amplitude phase computing unit alternately acquires from the orthogonal detector, and outputs the phase difference to the angle of inclination computing unit 302. The angle of inclination computing unit 302 computes the angle of inclination of the vehicle from the phase difference between the first IQ signal and the second IQ signal, and outputs the angle of inclination of the vehicle.

Figure 2:
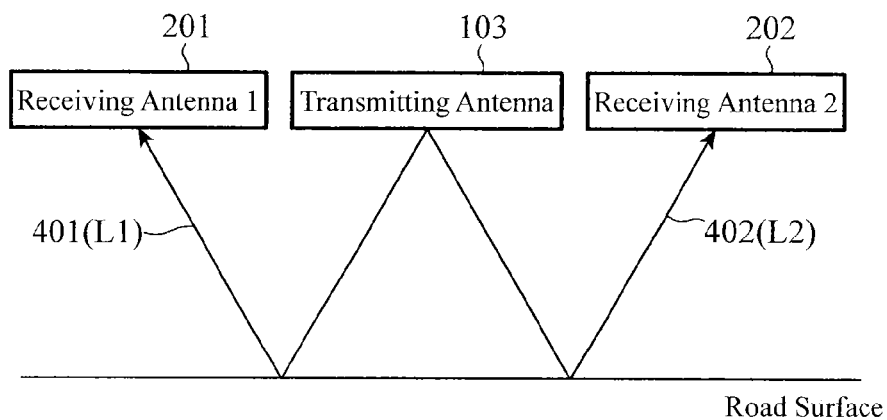
FIG. 2 is an explanatory drawing explaining propagation paths of a radio wave in the vehicle inclination detecting device in accordance with Embodiment 1 of the present invention.

FIG. 2 is an explanatory drawing explaining propagation paths of the radio wave in the vehicle inclination detecting device in accordance with Embodiment 1. More concretely, this figure is an explanatory drawing showing the paths through which the radio wave emitted from the transmitting antenna 103 is reflected by a road surface, and then propagates to the first receiving antenna 201 and the second receiving antenna 202. The transmitting antenna 103, the first receiving antenna 201, and the second receiving antenna 202 are arranged on an identical plane and aligned in a straight line and at equal intervals in the vehicle with the transmitting antenna 103 being centered among them. When the path length of the propagation path 401 from the transmitting antenna 103 to the first receiving antenna 201 is expressed as L1 and the path length of the propagation path from the transmitting antenna 103 to the second receiving antenna 202 is expressed as L2, the path lengths L1 and L2 are equal to each other when the vehicle is parallel to the road surface. In contrast with this, when the vehicle is inclined against the road surface, the path lengths L1 and L2 vary, and a path difference occurs between them.

The following relational expression is established between the path difference (L1−L2) and the phase difference φ computed from the wavelength λ and the IQ signals.

$$\phi = 2\pi \times (L1 - L2)/\lambda \quad (1)$$

Figure 3:
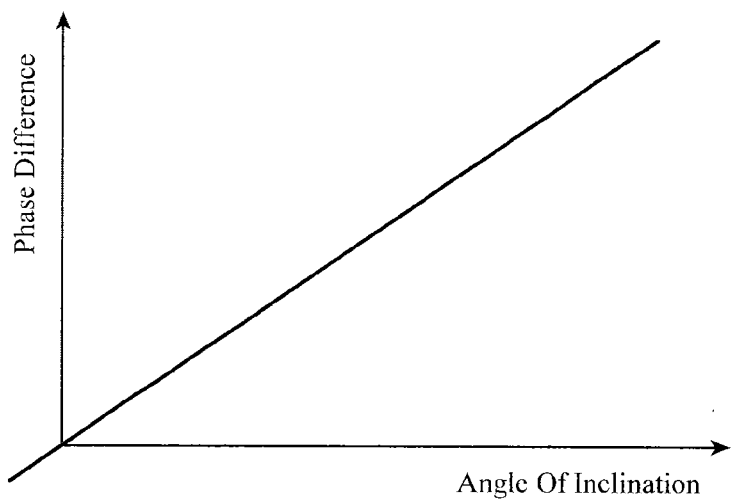
FIG. 3 is a diagram explaining a relationship between an angle of inclination and a phase difference in the vehicle inclination detecting device in accordance with Embodiment 1 of the present invention.

FIG. 3 is a diagram explaining a relationship between the angle of inclination and the phase difference in the vehicle inclination detecting device in accordance with Embodiment 1. When the horizontal axis is set to display the angle of inclination of the vehicle with respect to the road surface, and the vertical axis is set to display the phase difference, there is a one-to-one relationship between the angle of inclination and the phase difference, and therefore the angle of inclination can be computed from the phase difference.

Figure 4:
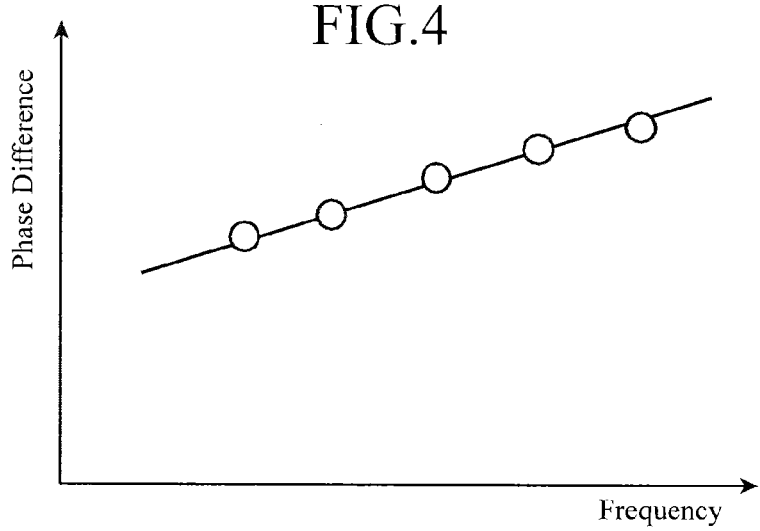
FIG. 4 is a diagram explaining a relationship between a frequency and the phase difference in the vehicle inclination detecting device in accordance with Embodiment 1 of the present invention.

Further, FIG. 4 is a diagram explaining a relationship among phase differences which are computed from the IQ signals acquired for a plurality of frequencies by the amplitude phase computing unit 301. In this figure, the horizontal axis shows a frequency and the vertical axis shows a phase difference. The wavelength becomes short and the wavelength λ in the above-mentioned equation (1) becomes short with increase in the frequency. Therefore, the phase difference becomes large with increase in the frequency even when the path lengths are constant, and a relationship shown by a straight line in FIG. 4 is established between the frequency and the phase difference.

Therefore, when selecting arbitrary frequencies and transmitting transmission signals having these frequencies or when transmitting transmission signals having different frequencies in a time division way, the angle of inclination computing unit 302 carries out linear approximation on plotted points of the phase differences which are respectively determined from the IQ signals acquired for the frequencies by the amplitude phase computing unit 301 to derive a straight line as shown in FIG. 4. The angle of inclination computing unit 302 computes the phase difference at the predetermined frequency from this approximated straight line, and computes the angle of inclination of the vehicle from the computed phase difference. The relationship between the phase difference and the angle of inclination which are thus computed is the same as that explained with reference to FIG. 3.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because the single line is provided between the switching unit 601 and the orthogonal detector 701, and hence the phase length through which the first received signal passes is made to be the same as that through which the second received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy.

Embodiment 2

Figure 5:
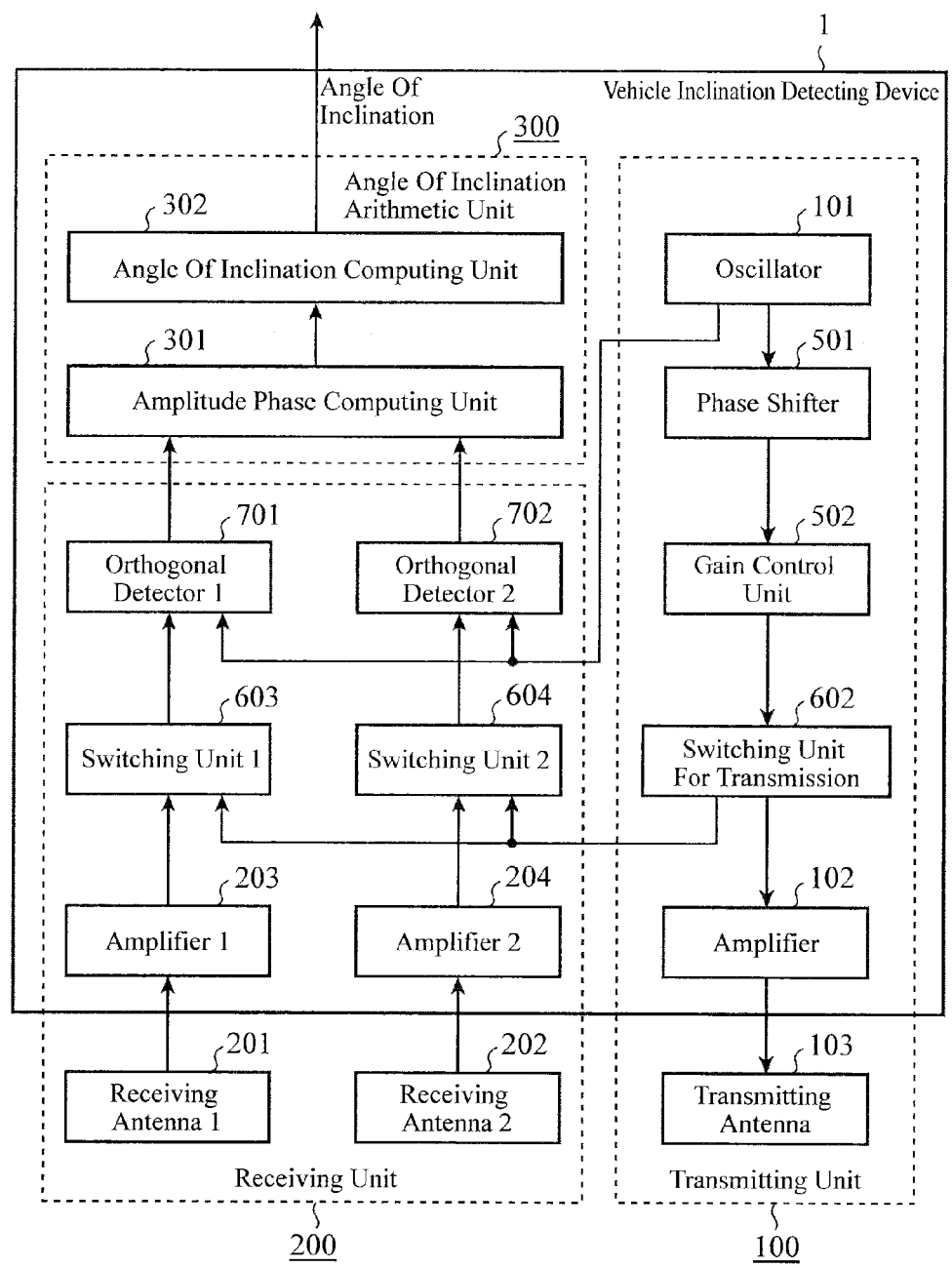
FIG. 5 is a block diagram of a vehicle inclination detecting device in accordance with Embodiment 2 of the present invention.

FIG. 5 is a block diagram showing the structure of a vehicle inclination detecting device 1 in accordance with Embodiment 2 of the present invention. The vehicle inclination detecting device 1 includes a transmitting unit 100, a receiving unit 200, and an angle of inclination arithmetic unit 300. The transmitting unit 100 includes an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 603, a second switching unit 604, a first orthogonal detector 701, and a second orthogonal detector 702. The angle of inclination arithmetic unit 300 includes an amplitude phase computing unit 301 and an angle of inclination computing unit 302. In FIG. 5, the same reference numerals as those shown in other figures denote the same components or like components, and the same goes for other embodiments. Further, the descriptions of the components shown in the entire specification are provided as examples, and the present invention is not limited to these descriptions.

Next, the operation of the vehicle inclination detecting device will be explained. In the transmitting unit 100, an oscillating signal having a predetermined frequency, a predetermined amplitude, and a predetermined phase outputted from the oscillator 101 is converted into a transmission signal whose phase is rotated by the phase shifter 501. A method of rotating the phase can be implemented in an analog way or in a digital way, and the phase of the oscillating signal is rotated by one cycle (360 degrees). The gain control unit 502 sets the level of the transmission signal whose phase is rotated to a predetermined level, and outputs the transmission signal to the transmitting antenna 103 by way of the switching unit 602 for transmission and the amplifier 102. The transmission signal inputted to the transmitting antenna 103 is emitted as a radio wave.

The first receiving antenna 201 receives the radio wave emitted from the transmitting unit 100, and outputs the radio wave as a first received signal. The first amplifier 203 carries out power amplification on the first received signal up to a predetermined level, and outputs the first received signal to the first orthogonal detector 701 by way of the first switching unit 603. The first orthogonal detector 701 carries out orthogonal detection (IQ detection) on both the oscillating signal from the oscillator 101 in the transmitting unit 100 and the first received signal, and outputs a first IQ signal to the angle of inclination arithmetic unit 300.

Similarly, the second receiving antenna 202 receives the radio wave emitted from the transmitting unit 100, and outputs the radio wave as a second received signal. The second amplifier 204 carries out power amplification on the second received signal up to a predetermined level, and outputs the second received signal to the second orthogonal detector 702 by way of the second switching unit 604. The second orthogonal detector 702 carries out orthogonal detection (IQ detection) on both the oscillating signal from the oscillator 101 in the transmitting unit 100 and the second received signal, and outputs a second IQ signal to the angle of inclination arithmetic unit 300.

Further, as an operation different from the above-mentioned operation, the switching unit 602 for transmission inputs the transmission signal whose phase is rotated to the first orthogonal detector 701 and the second orthogonal detector 702 by way of the first switching unit 603 and the second switching unit 604 to cause the first orthogonal detector and the second orthogonal detector to respectively output a third IQ signal and a fourth IQ signal to the angle of inclination arithmetic unit 300.

The amplitude phase computing unit 301 in the angle of inclination arithmetic unit 300 acquires phase rotation linearity characteristics of the first orthogonal detector 701 and those of the second orthogonal detector 702 from the third IQ signal and the fourth IQ signal, and prepares self-calibration data used for correcting the phase rotation linearity characteristics to normal phase rotation characteristics. The amplitude phase computing unit derives a phase difference from the amplitude and the phase of the first IQ signal and those of the second IQ signal with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination.

Figure 6:
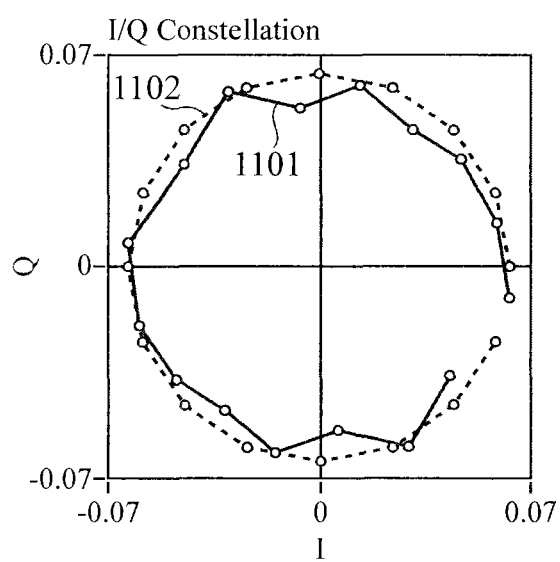
FIG. 6 is a diagram showing the phase characteristics of an orthogonal detector in accordance with Embodiment 2 of the present invention, and correction.

FIG. 6 shows an I/Q constellation showing an example of the phase rotation linearity characteristics (before the correction) of the first and second orthogonal detectors 701 and 702 and the normal phase rotation characteristics (after the correction) of the first and second orthogonal detectors 701 and 702. Even when the phase rotation linearity characteristics of each orthogonal detector are not good, as shown by a solid line 1101 in FIG. 6, the vehicle inclination detecting device can compute the angle of inclination of the vehicle with a high degree of accuracy by correcting the phase rotation linearity characteristics to normal phase rotation characteristics as shown by a dashed line 1102.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy.

Embodiment 3

Figure 7:
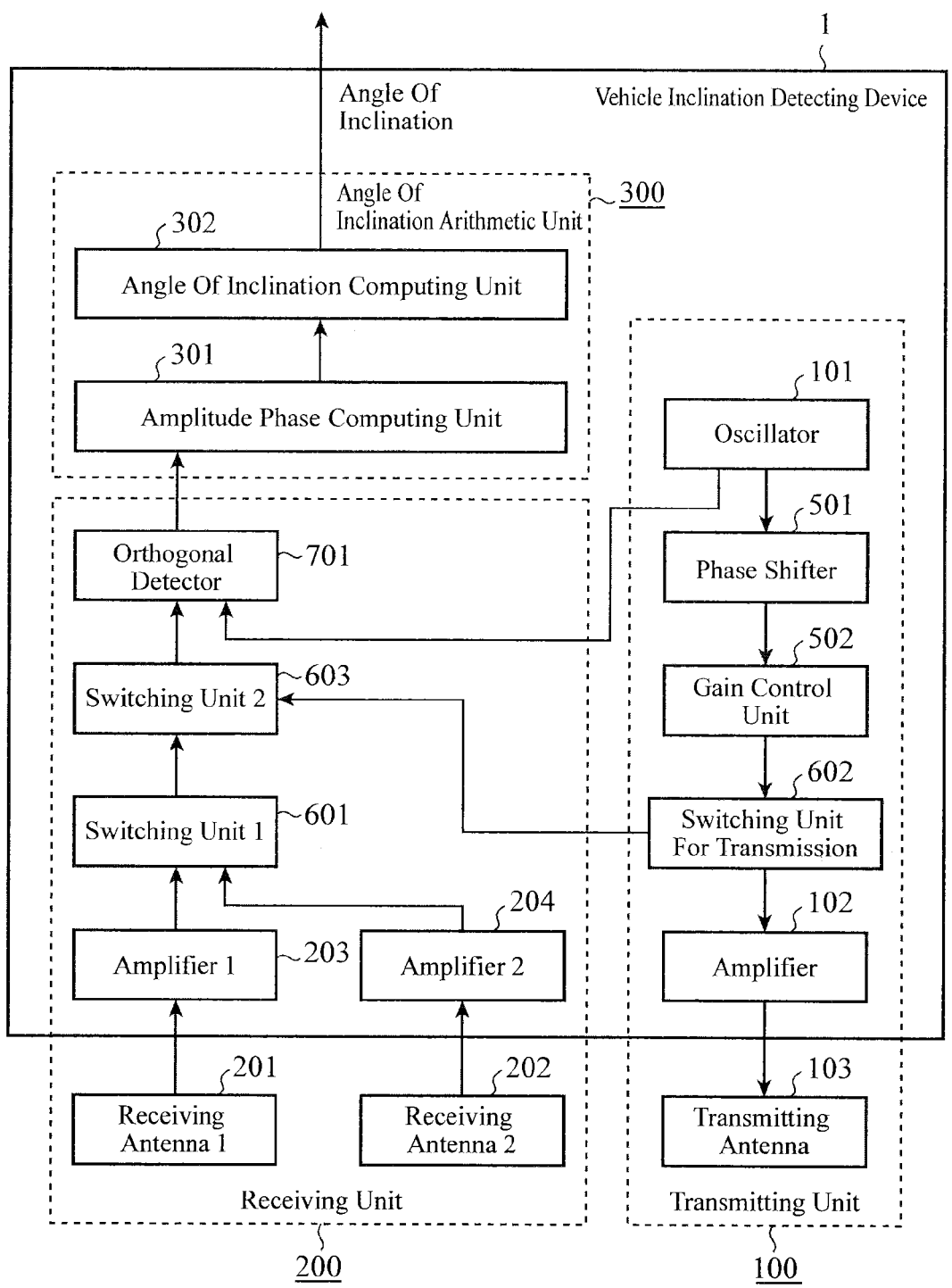
FIG. 7 is a block diagram of a vehicle inclination detecting device in accordance with Embodiment 3 of the present invention.

FIG. 7 is a block diagram showing the structure of a vehicle inclination detecting device 1 in accordance with Embodiment 3 of the present invention. This vehicle inclination detecting device 1 has a structure of combining the structure in accordance with above-mentioned Embodiment 1 (shown in FIG. 1), and that in accordance with above-mentioned Embodiment 2 (shown in FIG. 5), and includes a transmitting unit 100, a receiving unit 200, and an angle of inclination arithmetic unit 300. The transmitting unit 100 includes an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 601, a second switching unit 603, and an orthogonal detector 701. The angle of inclination arithmetic unit 300 includes an amplitude phase computing unit 301 and an angle of inclination computing unit 302.

Next, the operation of the vehicle inclination detecting device will be explained. In the transmitting unit 100, an oscillating signal having a predetermined frequency, a predetermined amplitude, and a predetermined phase outputted from the oscillator 101 is converted into a transmission signal whose phase is rotated by the phase shifter 501. A method of rotating the phase can be implemented in an analog way or in a digital way, and the phase of the oscillating signal is rotated by one cycle (360 degrees). The gain control unit 502 sets the level of the transmission signal whose phase is rotated to a predetermined level, and outputs the transmission signal to the transmitting antenna 103 by way of the switching unit 602 for transmission and the amplifier 102. The transmission signal inputted to the transmitting antenna 103 is emitted as a radio wave.

The receiving unit 200 receives the radio wave by way of the first receiving antenna 201 and the second receiving antenna 202 to acquire a first received signal and a second received signal. The received signals are inputted to the first switching unit 601 by way of the first and second amplifiers 203 and 204. The switching unit alternately switches between the received signals to alternately input the received signals to the orthogonal detector 701 by way of the second switching unit 603. The orthogonal detector 701 computes the amplitude value and the phase value (a first IQ signal or a second IQ signal) of each of the first and second received signals, and outputs the amplitude value and the phase value to the angle of inclination arithmetic unit 300.

Further, as an operation different from the above-mentioned operation, the first switching unit 601 inputs the transmission signal whose phase is rotated to the orthogonal detector 701 by way of the second switching unit 603, and the orthogonal detector outputs a third IQ signal to the angle of inclination arithmetic unit 300.

The amplitude phase computing unit 301 in the angle of inclination arithmetic unit 300 acquires phase rotation linearity characteristics of the orthogonal detector 701 from the third IQ signal, and prepares self-calibration data used for correcting the phase rotation linearity characteristics to normal phase rotation characteristics. The amplitude phase computing unit derives a phase difference from the amplitude value and the phase value of the first IQ signal and those of the second IQ signal with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first received signal passes is made to be the same as that through which the second received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy.

Embodiment 4

Figure 8:
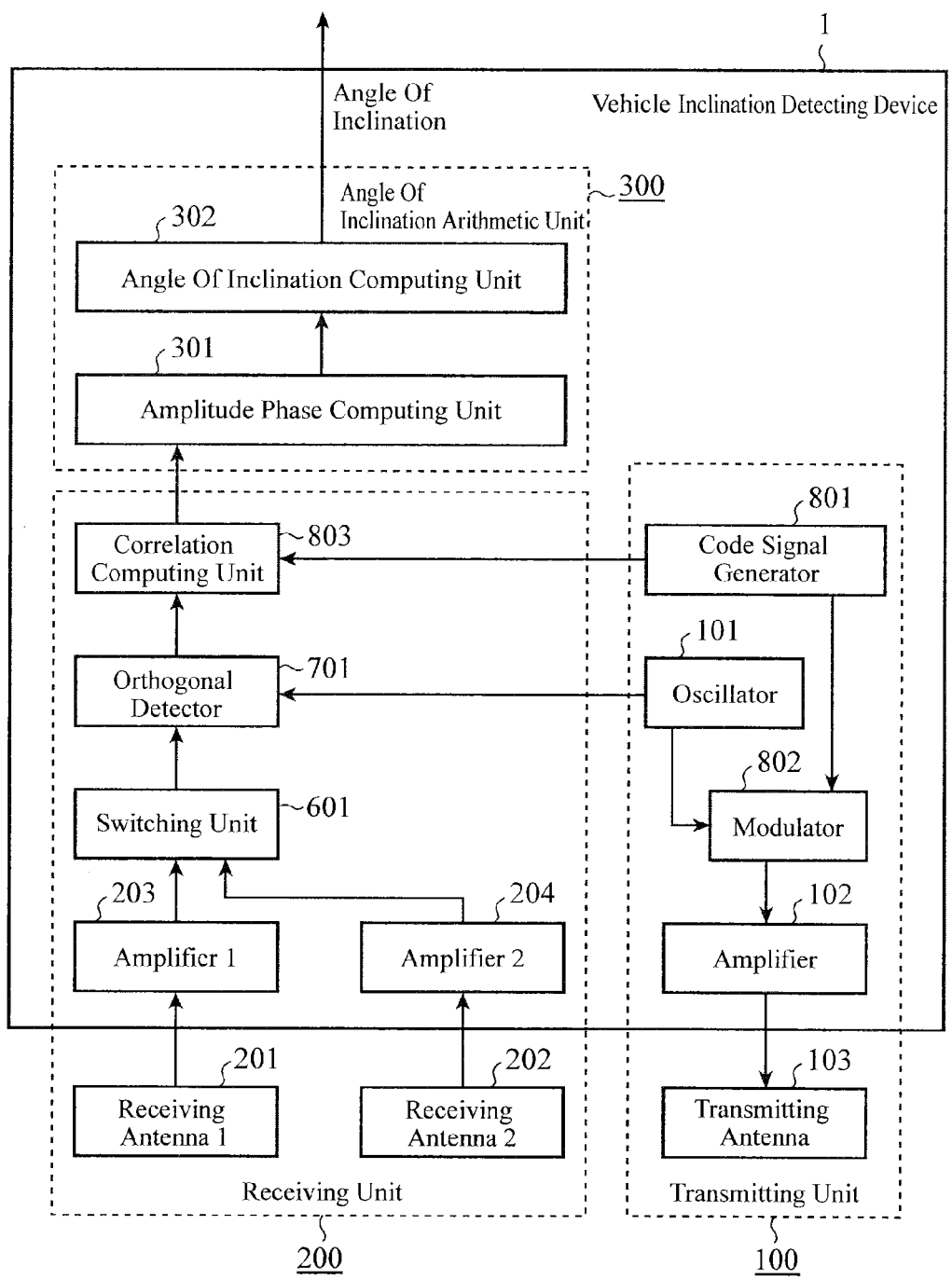
FIG. 8 is a block diagram of a vehicle inclination detecting device in accordance with Embodiment 4 of the present invention.

FIG. 8 is a block diagram showing the structure of a vehicle inclination detecting device 1 in accordance with Embodiment 4 of the present invention. The vehicle inclination detecting device 1 includes a transmitting unit 100, a receiving unit 200, and an angle of inclination arithmetic unit 300. The transmitting unit 100 includes a code signal generator 801, a modulator 802, an oscillator 101, an amplifier 102, and a transmitting antenna 103. The receiving unit 200 includes a first receiving antenna 201, a second receiving antenna 202, a first amplifier 203, a second amplifier 204, a switching unit 601, an orthogonal detector 701, and a correlation computing unit 803. The angle of inclination arithmetic unit 300 includes an amplitude phase computing unit 301 and an angle of inclination computing unit 302.

Next, the operation of the vehicle inclination detecting device will be explained. The modulator 802 in the transmitting unit 100 modulates an oscillating signal having a predetermined frequency which the oscillator 101 outputs with a code signal according to a predetermined code or an ID which the code signal generator 801 outputs, and outputs the oscillating signal modulated thereby to the transmitting antenna 103 byway of the amplifier 102. The oscillating signal modulated with the code signal is emitted as a radio wave from the transmitting antenna 103. As the transmitting antenna 103, any type of antenna, such as a directional antenna, an array antenna, a horn antenna, or a patch antenna, can be used. Further, the radio wave emitted from the transmitting antenna can be any type of radio wave, such as a vertically polarized wave, a horizontally polarized wave, or a circularly polarized wave.

The code signal generator 801 outputs information about the preset code or ID as the code signal. This code consists of a combination of codes, such as M-sequence codes, GOLD-sequence codes, or orthogonal-sequence codes. The code signal generated by the code signal generator 801 is inputted to both the modulator 802 in the transmitting unit 100 and the correlation computing unit 803 in the receiving unit 200.

The oscillator 101 generates an oscillating signal having the preset frequency, and outputs the oscillating signal to both the modulator 802 and the orthogonal detector 701 in the receiving unit 200. The modulator 802 carries out BPSK (Binary Phase Shift Keying) modulation on the code signal by using the oscillating signal as a carrier, and outputs the code signal modulated thereby to the amplifier 102 as a modulated signal. The amplifier 102 carries out power amplification on the modulated signal up to a predetermined level, and outputs this modulated signal to the transmitting antenna 103. The transmitting antenna 103 emits the modulated signal into space as a radio wave.

The receiving unit 200 receives the radio wave emitted from the transmitting antenna by way of the first receiving antenna 201 and the second receiving antenna 202 to acquire a first received signal and a second received signal. The received signals are power-amplified up to a predetermined level by the first and second amplifiers 203 and 204, respectively, and are inputted to the switching unit 601. The switching unit alternately switches between the received signals to alternately output the received signals to the orthogonal detector 701. The orthogonal detector 701 carries out orthogonal detection (IQ detection) on the first received signal or the second received signal and the oscillating signal from the oscillator 101 to compute an IQ signal of a first baseband signal or an IQ signal of a second baseband signal (a first IQ signal or a second IQ signal), and outputs the first IQ signal or the second IQ signal to the correlation computing unit 803. The correlation computing unit 803 carries out a correlation operation on the first IQ signal or the second IQ signal and the code signal from the code signal generator 801 to acquire the amplitude and the phase of a first correlation value or the amplitude and the phase of a second correlation value, and outputs the amplitude and the phase of the first correlation value or the amplitude and the phase of the second correlation value to the angle of inclination arithmetic unit 300.

More concretely, the correlation computing unit 803 carries out a correlation operation on the code signal generated by the code signal generator 801 and the first IQ signal or the second IQ signal, which the orthogonal detector 701 computes. In the correlation operation, the correlation computing unit computes a correlation for one cycle of the code signal, and computes a correlation value I corresponding to an I component and a correlation value Q corresponding to a Q component. The root sum square value of the correlation value I and the correlation value Q corresponds to the amplitude of the received signal, and the arc tangent of the correlation value I and the correlation value Q corresponds to the phase of the first received signal. The correlation computing unit 803 outputs these calculated amplitude and phase of the first correlation value or these calculated amplitude and phase of the second correlation value to the amplitude phase computing unit 301.

The amplitude phase computing unit 301 in the angle of inclination arithmetic unit 300 alternately acquires the amplitude and the phase of the first correlation value, and the amplitude and the phase of the second correlation value to compute a phase difference, and the angle of inclination computing unit 302 computes the angle of inclination of the vehicle from this phase difference. The phase difference between the phase of the first correlation value and that of the second correlation value and the angle of inclination has the same one-to-one relationship as that shown in FIG. 3 explained in above-mentioned Embodiment 1, and the vehicle inclination detecting device can compute the angle of inclination on the basis of this one-to-one relationship.

As an alternative, the correlation computing unit 803 in the receiving unit 200 can carry out a correlation operation using the first IQ signal and the second IQ signal to compute the amplitude and the phase of a correlation value, and the angle of inclination computing unit 302 in the angle of inclination arithmetic unit 300 can compute the angle of inclination of the vehicle from the correlation value. At this time, the amplitude and the phase which are computed correspond to the product of the amplitude of the first correlation value and that of the second correlation value, and the phase difference between the phase of the first correlation value and that of the second correlation value, respectively.

As mentioned above, the vehicle inclination detecting device 1 provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phase difference between the correlation values even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first received signal passes is made to be the same as that through which the second received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy.

Embodiment 5

Figure 9:
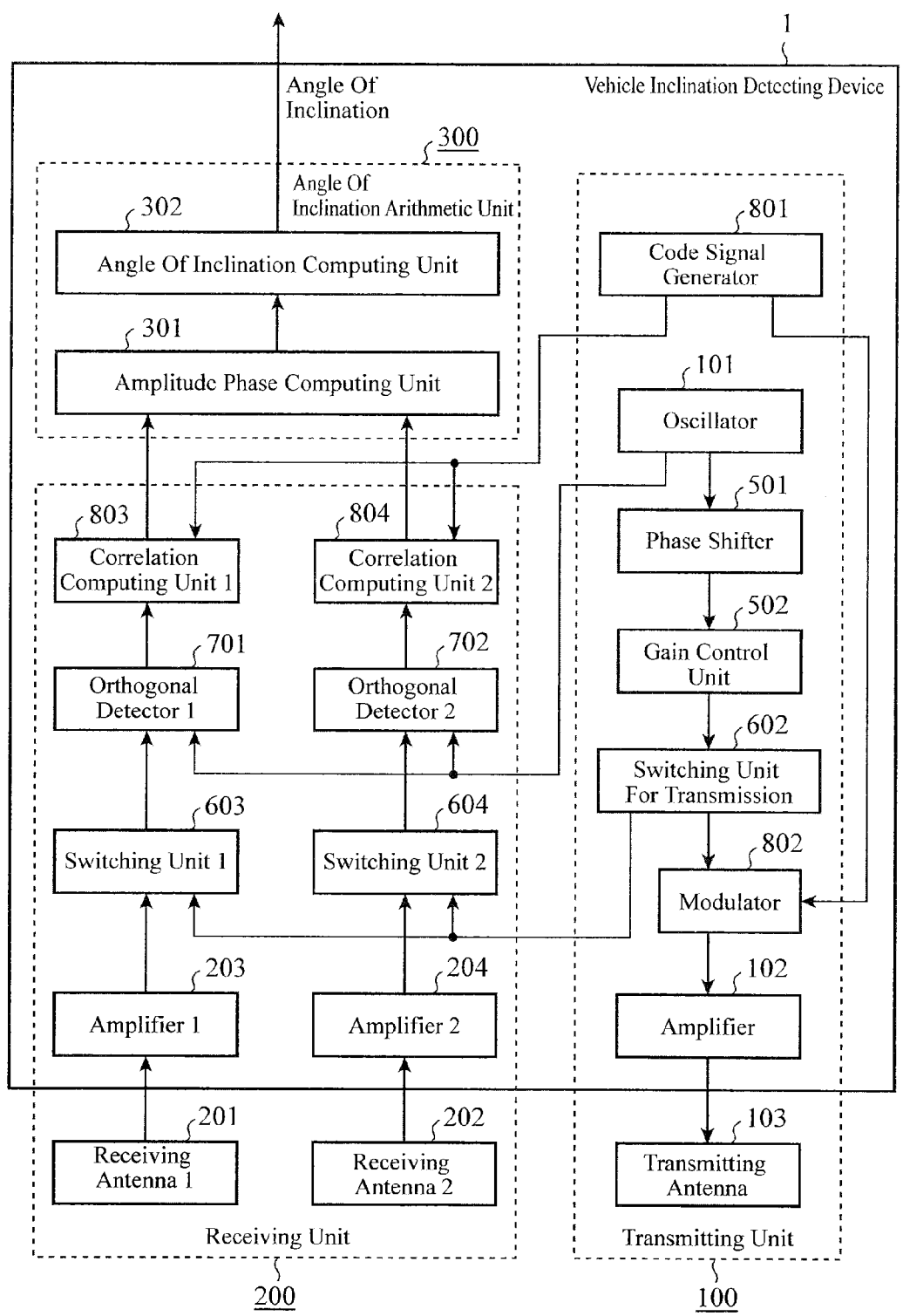
FIG. 9 is a block diagram of a vehicle inclination detecting device in accordance with Embodiment 5 of the present invention.

FIG. 9 is a block diagram showing the structure of a vehicle inclination detecting device 1 in accordance with Embodiment 5 of the present invention. The vehicle inclination detecting device 1 includes a transmitting unit 100, a receiving unit 200, and an angle of inclination arithmetic unit 300. The transmitting unit 100 includes a code signal generator 801, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 603, a second switching unit 604, a first orthogonal detector 701, a second orthogonal detector 702, a first correlation computing unit 803, and a second correlation computing unit 804. The angle of inclination arithmetic unit 300 includes an amplitude phase computing unit 301 and an angle of inclination computing unit 302.

Next, the operation of the vehicle inclination detecting device will be explained. In the transmitting unit 100, an oscillating signal having a predetermined frequency which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the switching unit 602 for transmission. The modulator 802 modulates this transmission signal with a code signal according to a predetermined code or an ID which the code signal generator 801 outputs, and outputs the transmission signal modulated thereby to the transmitting antenna 103 by way of the amplifier 102. A method of rotating the phase using the phase shifter 501 can be implemented in an analog way or in a digital way, and the phase of the oscillating signal is rotated by one cycle (360 degrees). The transmission signal code-modulated is emitted as a radio wave from the transmitting antenna 103.

The first receiving antenna 201 receives the radio wave emitted from the transmitting unit 100, and outputs the radio wave as a first received signal. The first amplifier 203 carries out power amplification on the first received signal up to a predetermined level, and outputs the first received signal amplified thereby to the first orthogonal detector 701 by way of the first switching unit 603. The first orthogonal detector 701 carries out orthogonal detection (IQ detection) on the oscillating signal from the oscillator 101 in the transmitting unit 100 and the first received signal to output an IQ signal (first IQ signal) of a first baseband signal to the first correlation computing unit 803. The first correlation computing unit 803 carries out a correlation operation on the first IQ signal and the code signal from the code signal generator 801 to output the amplitude and the phase of a first correlation value to the angle of inclination arithmetic unit 300.

Similarly, the second receiving antenna 202 receives the radio wave emitted from the transmitting unit 100, and outputs the radio wave as a second received signal. The second amplifier 204 carries out power amplification on the second received signal up to a predetermined level, and outputs the second received signal amplified thereby to the second orthogonal detector 702 by way of the second switching unit 604. The second orthogonal detector 702 carries out orthogonal detection (IQ detection) on the oscillating signal from the oscillator 101 in the transmitting unit 100 and the second received signal to output an IQ signal (second IQ signal) of a second baseband signal to the second correlation computing unit 804. The second correlation computing unit 804 carries out a correlation operation on the second IQ signal and the code signal from the code signal generator 801 to output the amplitude and the phase of a second correlation value to the angle of inclination arithmetic unit 300.

Further, as an operation different from the above-mentioned operation, the switching unit 602 for transmission inputs the transmission signal whose phase is rotated to the first orthogonal detector 701 and the second orthogonal detector 702 by way of the first switching unit 603 and the second switching unit 604 to cause the first orthogonal detector and the second orthogonal detector to carry out orthogonal detection (IQ detection) on the oscillating signal from the oscillator 101 in the transmitting unit 100 and the transmission signal to generate and input an IQ signal (third IQ signal) of a third baseband signal and an IQ signal (fourth IQ signal) of a fourth baseband signal to the first correlation computing unit 803 and the second correlation computing unit 804, respectively. The first and second correlation computing units 803 and 804 do not carry out correlation operations on the third IQ signal and the fourth IQ signal with the code signal from the code signal generator 801, respectively, and output the third IQ signal and the fourth IQ signal to the angle of inclination arithmetic unit 300 as the amplitude and the phase of a third correlation value and the amplitude and the phase of a fourth correlation value, respectively.

The amplitude phase computing unit 301 in the angle of inclination arithmetic unit 300 acquires phase rotation linearity characteristics of the first orthogonal detector 701 and those of the second orthogonal detector 702 from the amplitude and the phase of the third correlation value and those of the fourth correlation value, and prepares self-calibration data used for correcting the phase rotation linearity characteristics to normal phase rotation characteristics. The amplitude phase computing unit derives a phase difference from the amplitude and the phase of the first correlation value and those of the second correlation value with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the first and second orthogonal detectors 701 and 702, and the correction of the phase rotation linearity characteristics to the normal phase rotation characteristics by the amplitude phase computing unit 301 are the same as those shown in FIG. 6 explained in above-mentioned Embodiment 2.

As an alternative, the first correlation computing unit 803 in the receiving unit 200 can carry out a correlation operation using the first IQ signal and the second IQ signal to compute the amplitude and the phase of a correlation value, and the angle of inclination computing unit 302 in the angle of inclination arithmetic unit 300 can compute the angle of inclination of the vehicle from the correlation value (or the second correlation computing unit 804 can do this process instead of the first correlation computing unit). At this time, the amplitude and the phase which are computed correspond to the product of the amplitude of the first correlation value and that of the second correlation value, and the phase difference between the phase of the first correlation value and that of the second correlation value, respectively.

As mentioned above, the vehicle inclination detecting device 1 provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phase difference between the correlation values even if the received signal levels vary, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy.

Embodiment 6

Figure 10:
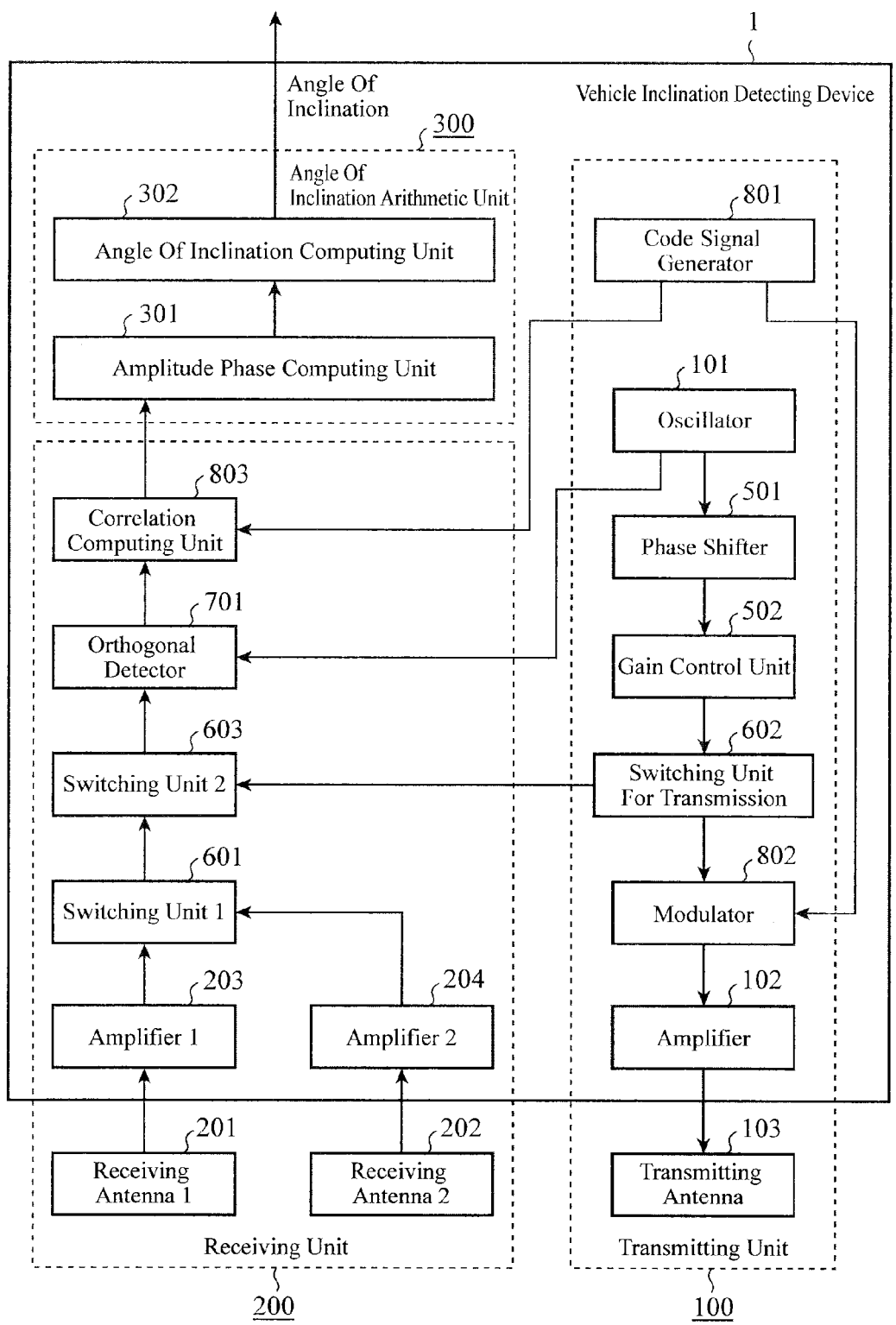
FIG. 10 is a block diagram of a vehicle inclination detecting device in accordance with Embodiment 6 of the present invention.

FIG. 10 is a block diagram showing the structure of a vehicle inclination detecting device 1 in accordance with Embodiment 6 of the present invention. This vehicle inclination detecting device 1 has a structure of combining the structure in accordance with above-mentioned Embodiment 4 (shown in FIG. 8), and that in accordance with above-mentioned Embodiment 5 (shown in FIG. 9), and includes a transmitting unit 100, a receiving unit 200, and an angle of inclination arithmetic unit 300. The transmitting unit 100 includes a code signal generator 801, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 601, a second switching unit 603, an orthogonal detector 701, and a correlation computing unit 803. The angle of inclination arithmetic unit 300 includes an amplitude phase computing unit 301 and an angle of inclination computing unit 302.

Next, the operation of the vehicle inclination detecting device will be explained. In the transmitting unit 100, an oscillating signal having a predetermined frequency which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the switching unit 602 for transmission. The modulator 802 modulates this transmission signal with a code signal according to a predetermined code or an ID which the code signal generator 801 outputs, and outputs the transmission signal modulated thereby to the transmitting antenna 103 by way of the amplifier 102. A method of rotating the phase using the phase shifter 501 can be implemented in an analog way or in a digital way, and the phase of the oscillating signal is rotated by one cycle (360 degrees). The transmission signal code-modulated is emitted as a radio wave from the transmitting antenna 103.

The receiving unit 200 receives the radio wave emitted from the transmitting antenna by way of the first receiving antenna 201 and the second receiving antenna 202 to acquire a first received signal and a second received signal. The received signals are power-amplified up to a predetermined level by the first and second amplifiers 203 and 204, respectively, and are inputted to the first switching unit 601. The first switching unit alternately switches between the received signals to alternately input the received signals to the orthogonal detector 701 byway of the second switching unit 603. The orthogonal detector 701 carries out orthogonal detection (IQ detection) on the first received signal or the second received signal and the oscillating signal from the oscillator 101 to compute an IQ signal of a first baseband signal or an IQ signal of a second baseband signal (a first IQ signal or a second IQ signal), and outputs the first IQ signal or the second IQ signal to the correlation computing unit 803. The correlation computing unit 803 carries out a correlation operation on the first IQ signal or the second IQ signal and the code signal from the code signal generator 801 to acquire the amplitude and the phase of a first correlation value or the amplitude and the phase of a second correlation value, and outputs the amplitude and the phase of the first correlation value or the amplitude and the phase of the second correlation value to the angle of inclination arithmetic unit 300.

Further, as an operation different from the above-mentioned operation, the switching unit 602 for transmission inputs the transmission signal whose phase is rotated to the first orthogonal detector 701 by way of the second switching unit 603 to cause the orthogonal detector to carry out orthogonal detection (IQ detection) on the oscillating signal from the oscillator 101 in the transmitting unit 100 and the transmission signal to generate and input an IQ signal (third IQ signal) of a third baseband signal to the correlation computing unit 803. The correlation computing unit 803 does not carry out a correlation operation on the third IQ signal with the code signal from the code signal generator 801, and outputs the third IQ signal to the angle of inclination arithmetic unit 300 as the amplitude and the phase of a third correlation value.

The amplitude phase computing unit 301 in the angle of inclination arithmetic unit 300 acquires phase rotation linearity characteristics of the orthogonal detector 701 from the amplitude and the phase of the third correlation value, and prepares self-calibration data used for correcting the phase rotation linearity characteristics to normal phase rotation characteristics. The amplitude phase computing unit derives a phase difference from the amplitude and the phase of the first correlation value or those of the second correlation value with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the orthogonal detector 701, and the correction of the phase rotation linearity characteristics to the normal phase rotation characteristics by the amplitude phase computing unit 301 are the same as those shown in FIG. 6 explained in above-mentioned Embodiment 2.

As an alternative, the correlation computing unit 803 in the receiving unit 200 can carry out a correlation operation using the first IQ signal and the second IQ signal to compute the amplitude and the phase of a correlation value, and the angle of inclination computing unit 302 in the angle of inclination arithmetic unit 300 can compute the angle of inclination of the vehicle from the correlation value. At this time, the amplitude and the phase which are computed correspond to the product of the amplitude of the first correlation value and that of the second correlation value, and the phase difference between the phase of the first correlation value and that of the second correlation value, respectively.

As mentioned above, the vehicle inclination detecting device 1 provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phase difference between the correlation values even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first received signal passes is made to be the same as that through which the second received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy.

Embodiment 7

Figure 11:
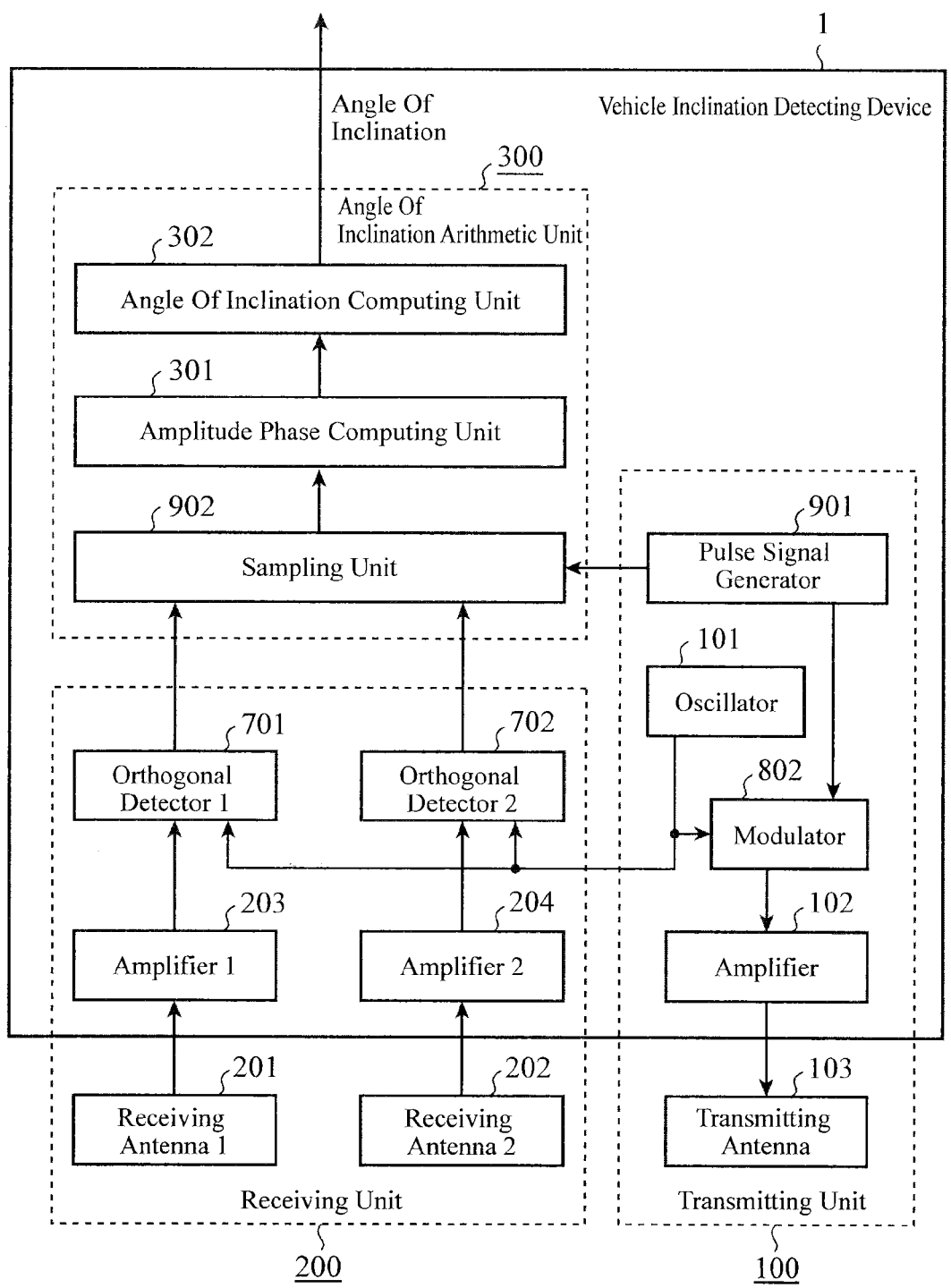
FIG. 11 is a block diagram of a vehicle inclination detecting device in accordance with Embodiment 7 of the present invention.

FIG. 11 is a block diagram showing the structure of a vehicle inclination detecting device 1 in accordance with Embodiment 7 of the present invention. The vehicle inclination detecting device 1 includes a transmitting unit 100, a receiving unit 200, and an angle of inclination arithmetic unit 300. The transmitting unit 100 includes a pulse signal generator 901, a modulator 802, an oscillator 101, an amplifier 102, and a transmitting antenna 103. The receiving unit 200 includes a first receiving antenna 201, a second receiving antenna 202, a first amplifier 203, a second amplifier 204, a first orthogonal detector 701, and a second orthogonal detector 702. The angle of inclination arithmetic unit 300 includes a sampling unit 902, an amplitude phase computing unit 301, and an angle of inclination computing unit 302.

Next, the operation of the vehicle inclination detecting device will be explained. The modulator 802 in the transmitting unit 100 carries out pulse modulation on an oscillating signal having a predetermined frequency which the oscillator 101 outputs with a series of pulses which the pulse signal generator 901 outputs, and outputs the oscillating signal modulated thereby to the transmitting antenna 103 by way of the amplifier 102 as a pulse transmission signal. The pulse transmission signal is emitted as a radio wave from the transmitting antenna 103. As the transmitting antenna 103, any type of antenna, such as a directional antenna, an array antenna, a horn antenna, or a patch antenna, can be used. Further, the radio wave emitted from the transmitting antenna can be any type of radio wave, such as a vertically polarized wave, a horizontally polarized wave, or a circularly polarized wave.

The first receiving antenna 201 receives the radio wave emitted from the transmitting unit 100, and outputs the radio wave as a first pulse received signal. The first amplifier 203 carries out power amplification on the first pulse received signal up to a predetermined level, and outputs the first pulse received signal amplified thereby to the first orthogonal detector 701. The first orthogonal detector 701 carries out orthogonal detection (IQ detection) on the oscillating signal from the oscillator 101 in the transmitting unit 100 and the first pulse received signal to output a first pulse IQ signal to the angle of inclination arithmetic unit 300.

Similarly, the second receiving antenna 202 receives the radio wave emitted from the transmitting unit 100, and outputs the radio wave as a second pulse received signal. The second amplifier 204 carries out power amplification on the second pulse received signal up to a predetermined level, and outputs the second pulse received signal amplified thereby to the second orthogonal detector 702. The second orthogonal detector 701 carries out orthogonal detection (IQ detection) on the oscillating signal from the oscillator 101 in the transmitting unit 100 and the second pulse received signal to output a second pulse IQ signal to the angle of inclination arithmetic unit 300.

Figure 12:
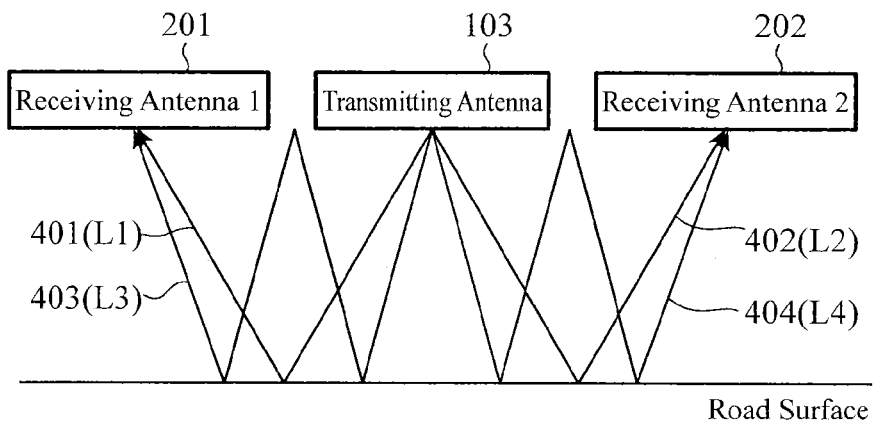
FIG. 12 is a diagram showing the plural reflection between the vehicle body and road surface in accordance with Embodiment 7 of the present invention.
Figure 12:
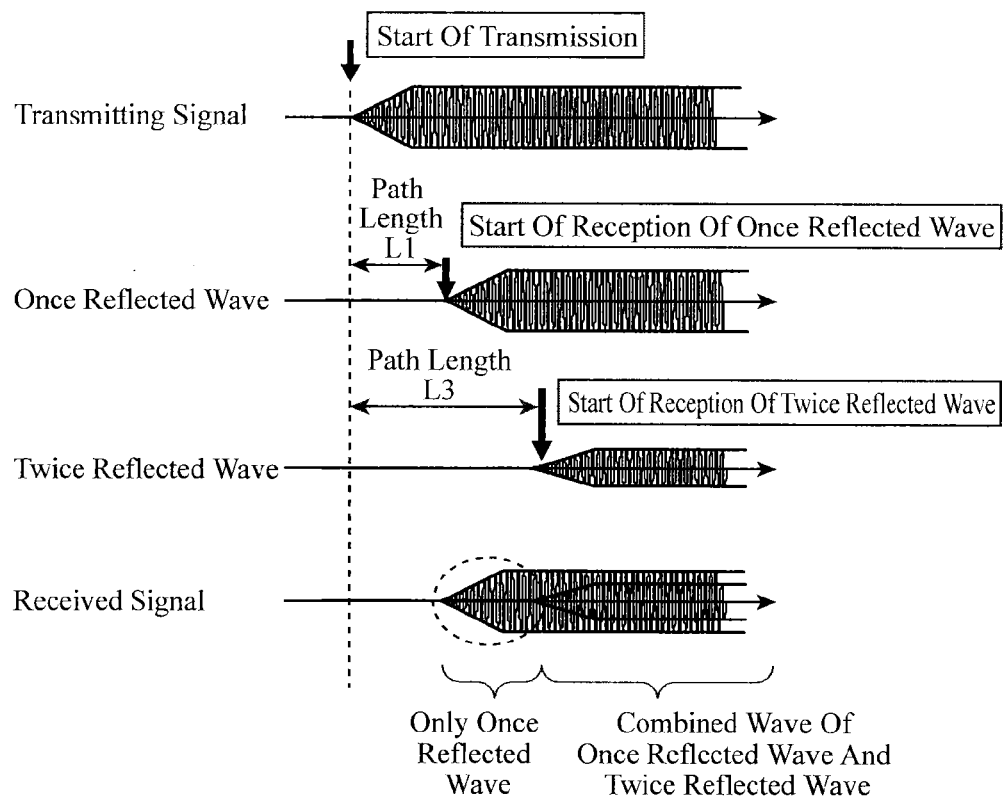

FIG. 12 is a diagram showing multiple reflections of the radio wave between a vehicle body and a road surface in the vehicle inclination detecting device in accordance with Embodiment 7. As shown in FIG. 12(*a*), when the radio wave reflected from the road surface is again emitted (reflected) from the vehicle body including the transmitting antenna 103, the first receiving antenna 201, and the second receiving antenna 202, and is then reflected again from the road surface and is received by the first receiving antenna 201 and the second receiving antenna 202, the length of the propagation path from the transmitting antenna 103 to the first receiving antenna 201 varies from the length L1 of the propagation path 401 to the length L3 of the propagation path 403. Similarly, the length of the propagation path from the transmitting antenna 103 to the second receiving antenna 202 varies from the length L2 of the propagation path 402 to the length L4 of the propagation path 404. Therefore, as shown in FIG. 12(b), the amplitudes and the phases of reflected waves according to the number of reflection times are piggybacked onto each of the first and second pulse IQ signals in time chronological in such a way that the amplitude and the phase of a reflected wave reflected once from the road surface, the amplitude and the phase of a reflected wave reflected twice from the road surface, the amplitude and the phase of a reflected wave reflected three times from the road surface, and so on are piggybacked onto each of the first and second pulse IQ signals.

Therefore, the sampling unit 902 in the angle of inclination arithmetic unit 300 samples the amplitude and the phase of the first pulse IQ signal and those of the second pulse IQ signal in time sequence in synchronization with the pulse signal from the pulse signal generator 901 in the transmitting unit 100, and separates the amplitude and the phase of a reflected wave reflected a predetermined number of times from the road surface from the reflected radio waves each reflected two or more times from the road surface which are piggybacked onto each of the first and second pulse IQ signals in time chronological to acquire the amplitude and the phase of the reflected wave. In this embodiment, in order to ensure the accuracy of the angle of inclination, the sampling unit separates only the amplitude and the phase of the reflected wave reflected once from the road surface to acquire the amplitude and the phase of the reflected wave. The amplitude phase computing unit 301 derives a phase difference from the amplitudes and the phases of the one-time reflected components of the first and second pulse IQ signals. The angle of inclination computing unit 302 computes the angle of inclination of the vehicle from this phase difference.

The vehicle inclination detecting device can use a relatively-high-speed AD (analog/digital) converter as the sampling unit 902 to acquire all sampled values of the amplitude and the phase of each pulse IQ signal in time sequence. As an alternative, the vehicle inclination detecting device can use a relatively-low-speed AD converter as the sampling unit to equivalently acquire all sampled values of the amplitude and the phase of each pulse IQ signal in time sequence by acquiring and collecting the amplitude and the phase of each pulse IQ signal while sliding the sampling position of the amplitude and the phase.

Figure 13:
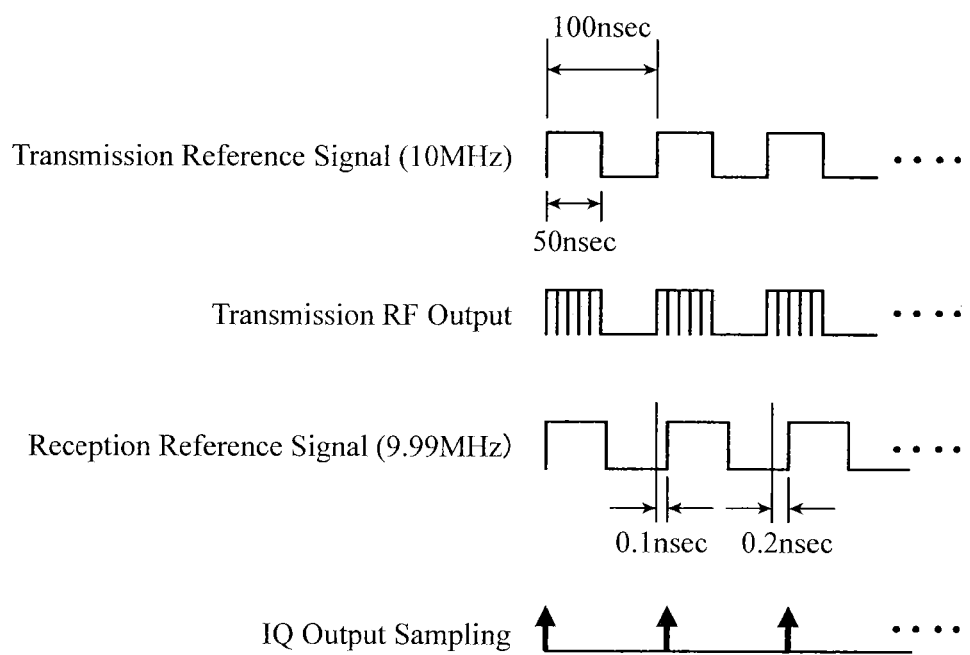
FIG. 13 is a diagram showing the sampling of a pulse transmission signal in the vehicle inclination detecting device in accordance with Embodiment 2 of the present invention.

FIG. 13 is a diagram showing the sampling of the pulse transmission signal by the sampling unit 902, and a case in which a relatively-low-speed AD converter is used will be explained. As an example, the modulation frequency for transmission from the pulse signal generator 901 to the modulator 802 is 10 MHz, and the sampling frequency for reception from the pulse signal generator 901 to the sampling unit 902 is 9.99 MHz. Because of the frequency difference between the modulation frequency and the sampling frequency, the sampling position where the sampling unit 902 samples each pulse IQ signal is slid in steps of 0.1 ns (=1/9.99 MHz-1/10 MHz) in a chronological direction. The collection of these slid sample data is equivalent to sampling by a high-speed AD converter corresponding to 10 GHz (=1/0.1 ns). Further, because the pulse width of each pulse IQ signal is 50 ns when the 10-MHz duty which is the modulation frequency for transmission is 50%, it is necessary to slide the sampling position where the sampling unit samples each pulse IQ signal having a series of 500 pulses in order to equivalently sample the pulse IQ signal across its entire pulse width. In addition, when the length of a round-trip path from the vehicle body to the road surface is taken into consideration, it is necessary to slide the sampling position a larger number of times. More specifically, because the propagation time required for the radio wave to travel the round-trip path is 1 ns when the distance between the vehicle body and the road surface is 15 cm, it is necessary to slide the sampling position ten (=1 ns/0.1 ns) times. In addition to the length of the round-trip path from the vehicle body to the road surface, the phase length from the AD converter (it corresponds to the sampling unit 902), which samples each pulse IQ signal at 9.99 MHz, to each of the first and second receiving antennas 201 and 202, the phase length from the modulator 802, which outputs the transmission signal modulated with 10 MHz, to the transmitting antenna 103, the synchronization times of 10 MHz and 9.99 MHz, etc. need to be taken into consideration.

As mentioned above, the vehicle inclination detecting device 1 provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phase difference between the pulse IQ signals even if the received signal levels vary, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. The pulse transmission signal emitted from the transmitting antenna does not have to be a pulse signal as long as the phase difference can be detected from the one-time reflected component.

Embodiment 8

Figure 14:
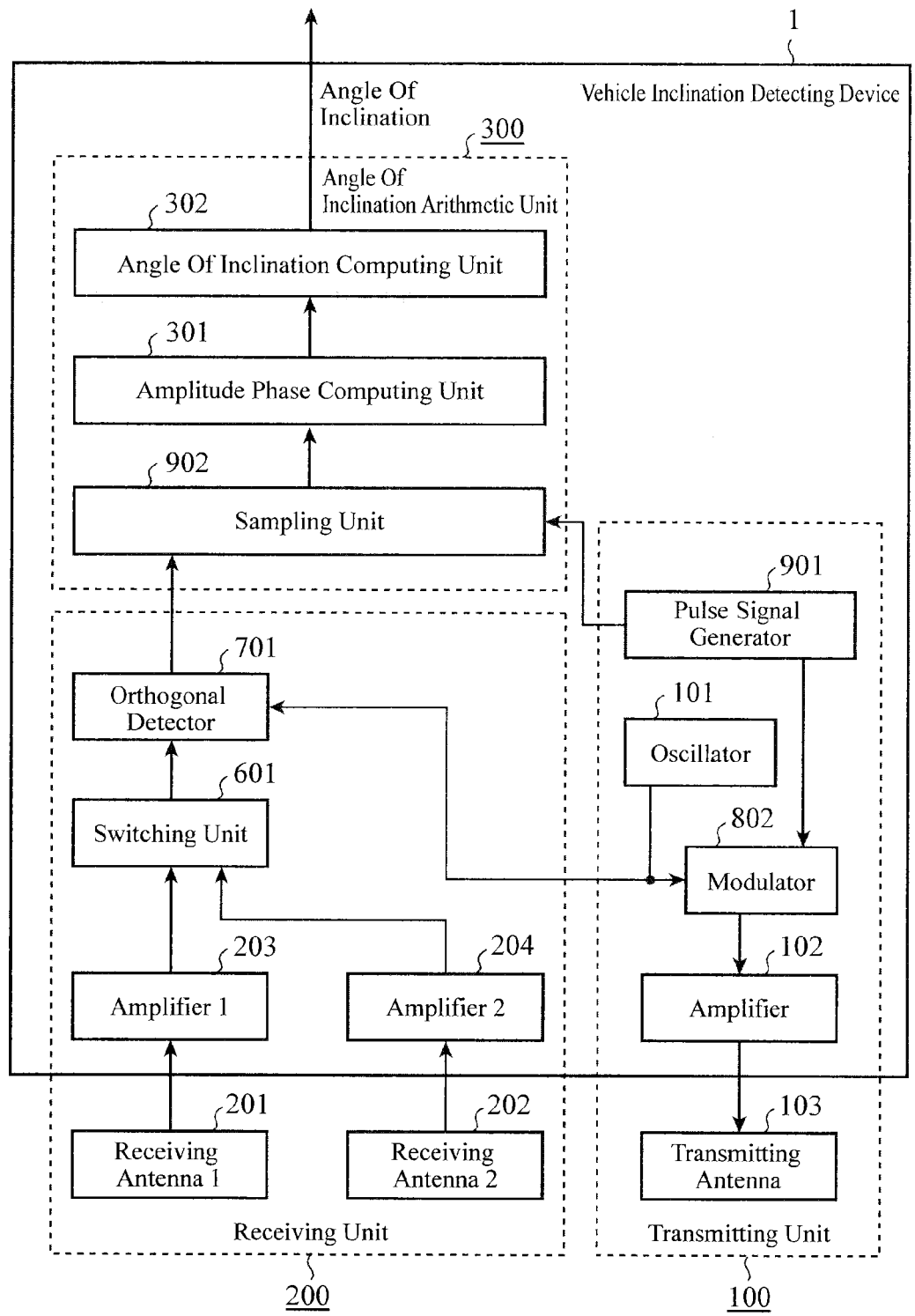
FIG. 14 is a block diagram of a vehicle inclination detecting device in accordance with Embodiment 8 of the present invention.

FIG. 14 is a block diagram showing the structure of a vehicle inclination detecting device 1 in accordance with Embodiment 8 of the present invention. This vehicle inclination detecting device 1 has a structure of combining the structure in accordance with above-mentioned Embodiment 1 (shown in FIG. 1), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a modulator 802, an oscillator 101, an amplifier 102, and a transmitting antenna 103. The receiving unit 200 includes a first receiving antenna 201, a second receiving antenna 202, a first amplifier 203, a second amplifier 204, a switching unit 601, and an orthogonal detector 701. The angle of inclination arithmetic unit 300 includes a sampling unit 902, an amplitude phase computing unit 301 and an angle of inclination computing unit 302.

Next, the operation of the vehicle inclination detecting device will be explained. The modulator 802 in the transmitting unit 100 carries out pulse modulation on an oscillating signal having a predetermined frequency which the oscillator 101 outputs with a series of pulses which the pulse signal generator 901 outputs, and outputs the oscillating signal modulated thereby to the transmitting antenna 103 by way of the amplifier 102 as a pulse transmission signal. The pulse transmission signal is emitted as a radio wave from the transmitting antenna 103.

The receiving unit 200 receives the radio wave emitted from the transmitting antenna by way of the first receiving antenna 201 and the second receiving antenna 202 to acquire a first pulse received signal and a second pulse received signal. The pulse received signals are inputted to the switching unit 601 by way of the first and second amplifiers 203 and 204, respectively. The switching unit alternately switches between the pulse received signals to alternately output the pulse received signals to the orthogonal detector 701. The orthogonal detector 701 carries out orthogonal detection (IQ detection) on the first pulse received signal or the second pulse received signal and the oscillating signal from the oscillator 101 to compute the amplitude value and the pulse value of each of a first pulse IQ signal and a second pulse IQ signal, and outputs the amplitude value and the pulse value of each of the first and second pulse IQ signals to the angle of inclination arithmetic unit 300.

The sampling unit 902 in the angle of inclination arithmetic unit 300 alternately samples the amplitude and the phase of the first pulse IQ signal and those of the second pulse IQ signal in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse IQ signals in chronological order to acquire the amplitude and the phase of the reflected wave. The amplitude phase computing unit 301 derives a phase difference from the amplitudes and the phases of one-time reflected components of the first and second pulse IQ signals. The angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phase difference between the pulse IQ signals even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first pulse received signal passes is made to be the same as that through which the second pulse received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. The pulse transmission signal emitted from the transmitting antenna does not have to be a pulse signal as long as the phase difference can be detected from the one-time reflected component.

Embodiment 9

Figure 15:
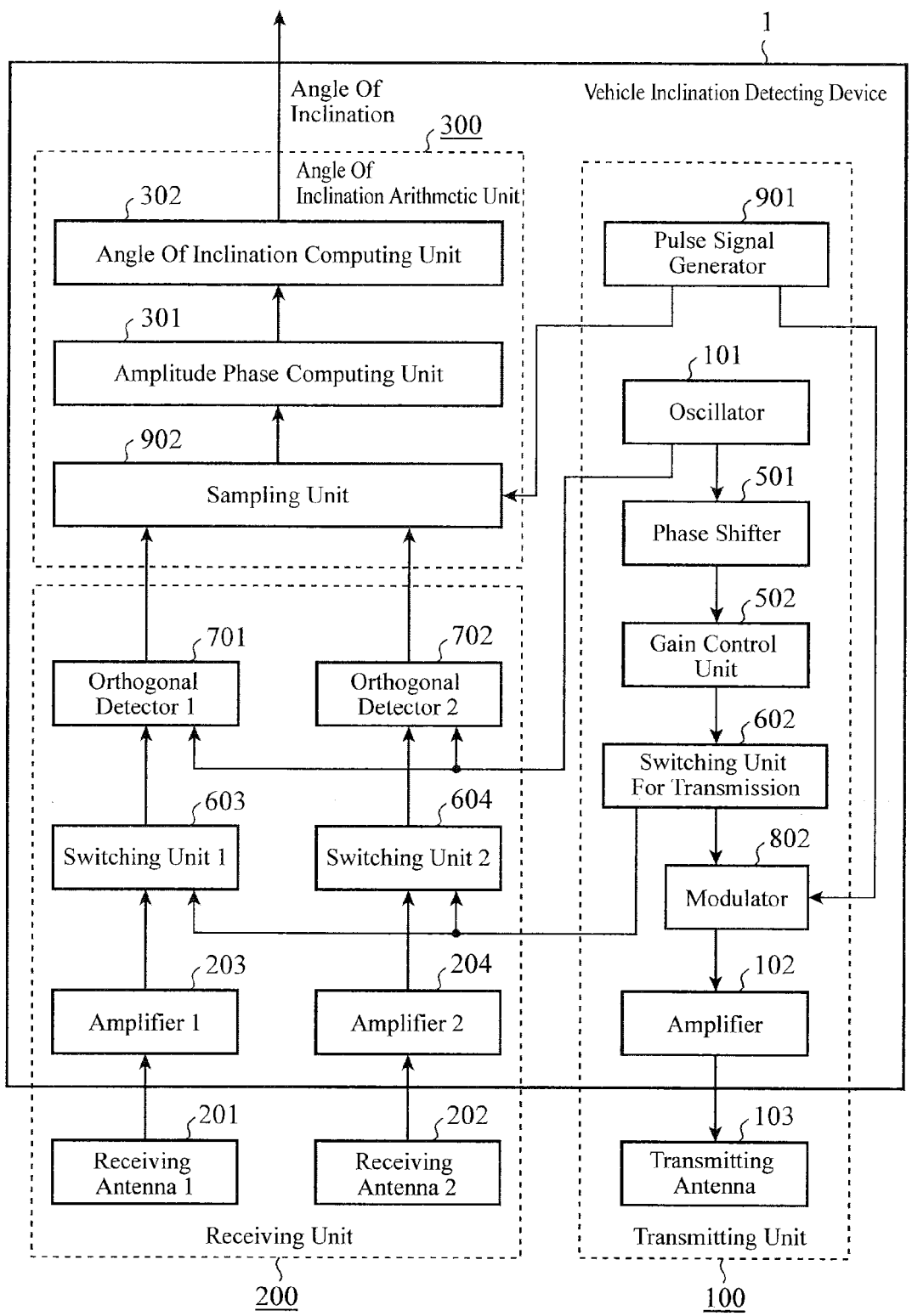
FIG. 15 is a block diagram of a vehicle inclination detecting device in accordance with Embodiment 9 of the present invention.

FIG. 15 is a block diagram showing the structure of a vehicle inclination detecting device 1 in accordance with Embodiment 9 of the present invention. This vehicle inclination detecting device 1 has a structure of combining the structure in accordance with above-mentioned Embodiment 2 (shown in FIG. 5), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 603, a second switching unit 604, a first orthogonal detector 701, and a second orthogonal detector 702. The angle of inclination arithmetic unit 300 includes a sampling unit 902, an amplitude phase computing unit 301, and an angle of inclination computing unit 302.

Next, the operation of the vehicle inclination detecting device will be explained. In the transmitting unit 100, an oscillating signal having a predetermined frequency, a predetermined amplitude, and a predetermined phase which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the switching unit 602 for transmission. The modulator 802 carries out pulse modulation on this transmission signal with a series of pulses which the pulse signal generator 901 outputs to generate a pulse transmission signal, and outputs the pulse transmission signal to the transmitting antenna 103 by way of the amplifier 102. A method of rotating the phase using the phase shifter 501 can be implemented in an analog way or in a digital way, and the phase of the oscillating signal is rotated by one cycle (360 degrees). The pulse transmission signal is emitted as a radio wave from the transmitting antenna 103.

The first receiving antenna 201 receives the radio wave emitted from the transmitting unit 100, and outputs the radio wave as a first pulse received signal. The first amplifier 203 carries out power amplification on the first pulse received signal up to a predetermined level, and outputs the first pulse received signal amplified thereby to the first orthogonal detector 701 by way of the first switching unit 603. The first orthogonal detector 701 carries out orthogonal detection (IQ detection) on the oscillating signal from the oscillator 101 in the transmitting unit 100 and the first pulse received signal to output a first pulse IQ signal to the angle of inclination arithmetic unit 300.

Similarly, the second receiving antenna 202 receives the radio wave emitted from the transmitting unit 100, and outputs the radio wave as a second pulse received signal. The second amplifier 204 carries out power amplification on the second pulse received signal up to a predetermined level, and outputs the second pulse received signal amplified thereby to the second orthogonal detector 702 by way of the second switching unit 604. The second orthogonal detector 702 carries out orthogonal detection (IQ detection) on the oscillating signal from the oscillator 101 in the transmitting unit 100 and the second pulse received signal to output a second pulse IQ signal to the angle of inclination arithmetic unit 300.

Further, as an operation different from the above-mentioned operation, the switching unit 602 for transmission inputs the transmission signal whose phase is rotated to the first orthogonal detector 701 and the second orthogonal detector 702 by way of the first switching unit 603 and the second switching unit 604 to cause the first orthogonal detector and the second orthogonal detector to carry out orthogonal detection (IQ detection) on the oscillating signal from the oscillator 101 in the transmitting unit 100 and the transmission signal to generate and input a third pulse IQ signal and a fourth pulse IQ signal to the angle of inclination arithmetic unit 300.

The sampling unit 902 in the angle of inclination arithmetic unit 300 samples and acquires the third pulse IQ signal and the fourth pulse IQ signal in synchronization with the pulse signal from the pulse signal generator 901 in the transmitting unit 100. The amplitude phase computing unit 301 acquires phase rotation linearity characteristics of the first orthogonal detector 701 and those of the second orthogonal detector 702 from the third pulse IQ signal and the fourth pulse IQ signal, which the sampling unit 902 samples and acquires, and prepares self-calibration data used for correcting the phase rotation linearity characteristics to normal phase rotation characteristics. The amplitude phase computing unit derives a phase difference from the amplitudes and the phases of the first and second pulse IQ signals with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the first and second orthogonal detectors 701 and 702, and the correction of the phase rotation linearity characteristics to the normal phase rotation characteristics by the amplitude phase computing unit 301 are the same as those shown in FIG. 6 explained in above-mentioned Embodiment 2.

In general, in the angle of inclination arithmetic unit 300, the sampling unit 902 samples the amplitude and the phase of the first pulse IQ signal and those of the second pulse IQ signal in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse IQ signals in time chronological to acquire the amplitude and the phase of the reflected wave. The amplitude phase computing unit 301 then derives a phase difference from the amplitudes and the phases of one-time reflected components of the first and second pulse IQ signals, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. The pulse transmission signal emitted from the transmitting antenna does not have to be a pulse signal as long as the phase difference can be detected from the one-time reflected component.

Embodiment 10

Figure 16:
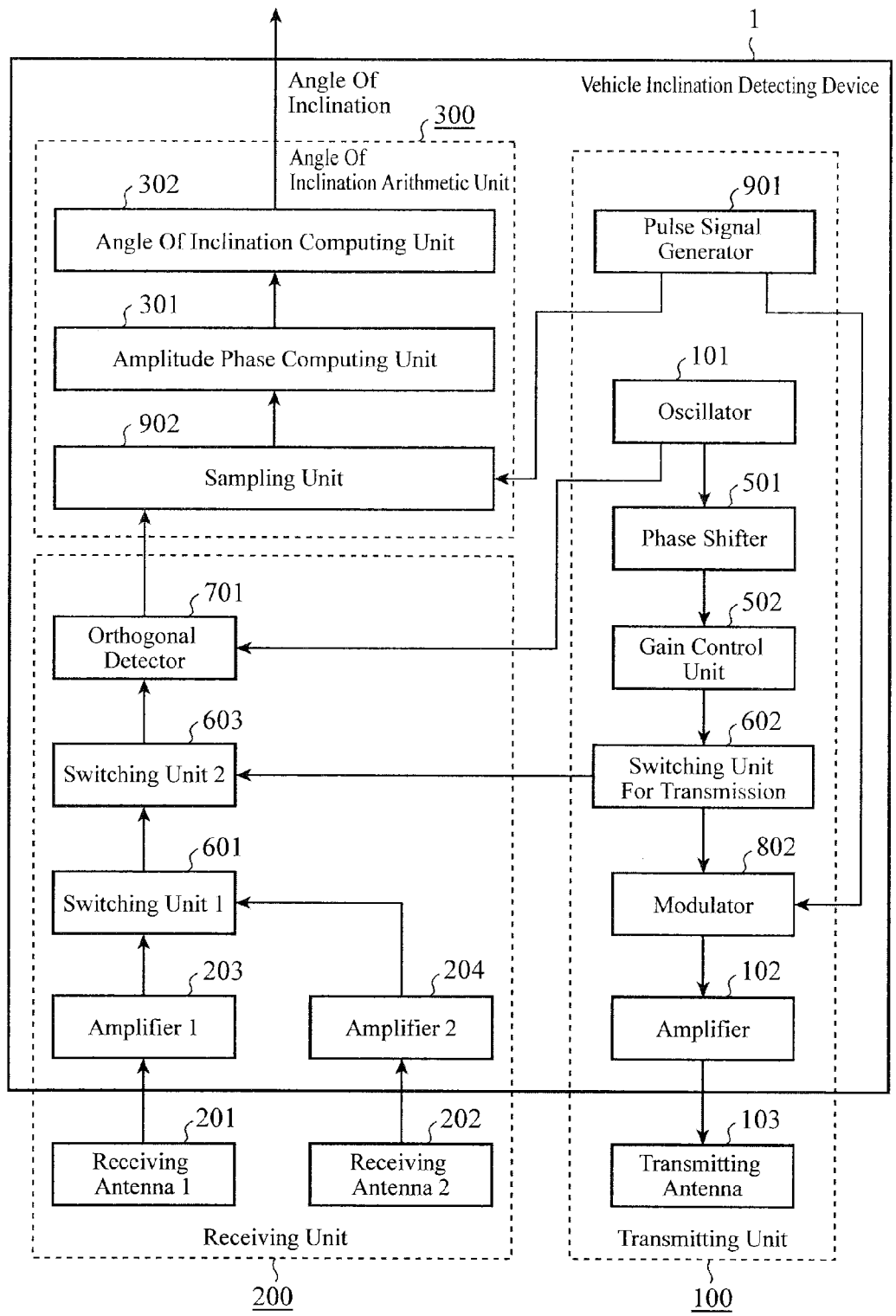
FIG. 16 is a block diagram of a vehicle inclination detecting device in accordance with Embodiment 10 of the present invention.

FIG. 16 is a block diagram showing the structure of a vehicle inclination detecting device 1 in accordance with Embodiment 10 of the present invention. This vehicle inclination detecting device 1 has a structure of combining the structure in accordance with above-mentioned Embodiment 3 (shown in FIG. 7), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 601, a second switching unit 603, and an orthogonal detector 701. The angle of inclination arithmetic unit 300 includes a sampling unit 902, an amplitude phase computing unit 301, and an angle of inclination computing unit 302.

Next, the operation of the vehicle inclination detecting device will be explained. In the transmitting unit 100, an oscillating signal having a predetermined frequency, a predetermined amplitude, and a predetermined phase which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the first switching unit 602. The modulator 802 carries out pulse modulation on this transmission signal with a series of pulses which the pulse signal generator 901 outputs to generate a pulse transmission signal, and outputs the pulse transmission signal to the transmitting antenna 103 by way of the amplifier 102. A method of rotating the phase using the phase shifter 501 can be implemented in an analog way or in a digital way, and the phase of the oscillating signal is rotated by one cycle (360 degrees). The pulse transmission signal is emitted as a radio wave from the transmitting antenna 103.

The receiving unit 200 receives the radio wave emitted from the transmitting antenna by way of the first receiving antenna 201 and the second receiving antenna 202 to acquire a first pulse received signal and a second pulse received signal. The pulse received signals are inputted to the first switching unit 601 by way of the first and second amplifiers 203 and 204, respectively. The switching unit alternately switches between the pulse received signals to alternately input the pulse received signals to the orthogonal detector 701 by way of the second switching unit 603. The orthogonal detector 701 computes the amplitude value and the pulse value of each of the first and second pulse received signals, and outputs the amplitude value and the pulse value of each of the first and second pulse received signals to the angle of inclination arithmetic unit 300.

Further, as an operation different from the above-mentioned operation, the switching unit 602 for transmission inputs the transmission signal whose phase is rotated to the orthogonal detector 701 by way of the second switching unit 603, and the orthogonal detector carries out orthogonal detection (IQ detection) on the oscillating signal from the oscillator 101 in the transmitting unit 100 and the transmission signal to output a third pulse IQ signal to the angle of inclination arithmetic unit 300.

The sampling unit 902 in the angle of inclination arithmetic unit 300 samples and acquires the third pulse IQ signal in synchronization with the pulse signal from the pulse signal generator 901 in the transmitting unit 100. The amplitude phase computing unit 301 acquires phase rotation linearity characteristics of the orthogonal detector 701 from the third pulse IQ signal, which the sampling unit 902 samples and acquires, and prepares self-calibration data used for correcting the phase rotation linearity characteristics to normal phase rotation characteristics. The amplitude phase computing unit derives a phase difference from the amplitudes and the phases of the first and second pulse IQ signals with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the orthogonal detector 701, and the correction of the phase rotation linearity characteristics to the normal phase rotation characteristics by the amplitude phase computing unit 301 are the same as those shown in FIG. 6 explained in above-mentioned Embodiment 2.

In general, in the angle of inclination arithmetic unit 300, the sampling unit 902 alternately samples the amplitude and the phase of the first pulse IQ signal and those of the second pulse IQ signal in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse IQ signals in time chronological to acquire the amplitude and the phase of the reflected wave. The amplitude phase computing unit 301 then derives a phase difference from the amplitudes and the phases of one-time reflected components of the first and second pulse IQ signals, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

Figure 17:
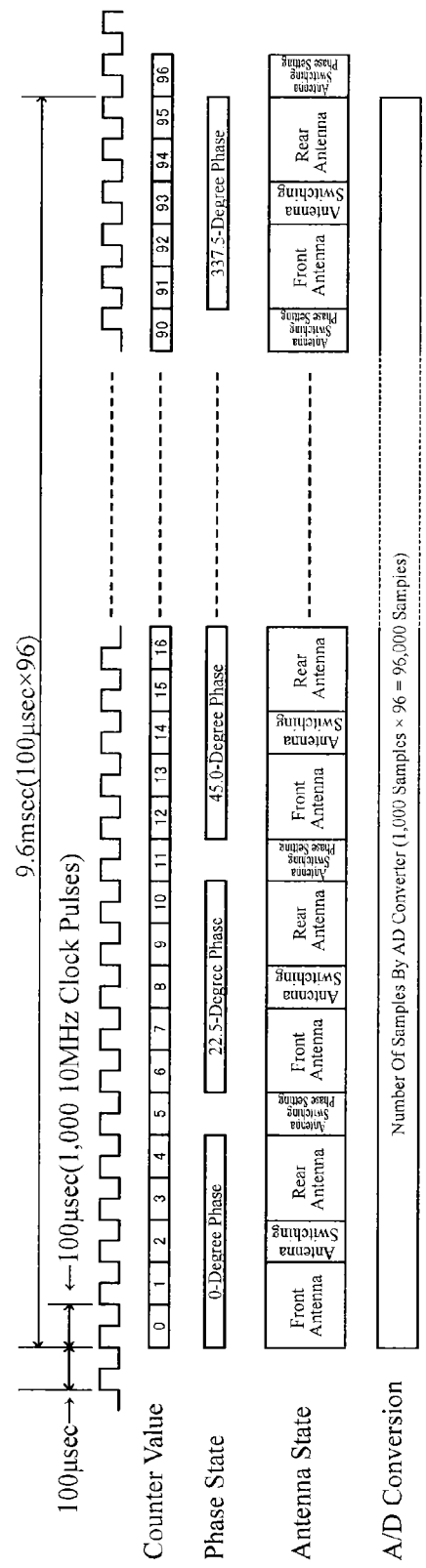
FIG. 17 is a diagram showing a row of receiving antenna data and phase data in the vehicle inclination detecting device in accordance with Embodiment 10 of the present invention.

Hereafter, an example of the data acquisition timing of the vehicle inclination detecting device 1 in accordance with Embodiment 10 will be explained with reference to FIG. 17. FIG. 17 is a diagram showing a row of receiving antenna data and phase data. This example shows the data acquisition timing in all combination states in a case in which the phase shifter 501 is a 4-bit (16 possible values) one, and the two receiving antennas 201 and 202 are used as a vehicle front antenna and a vehicle rear antenna, respectively. Further, when the sampling unit 902 (AD converter) acquires data of 2,000 samples for each phase state and for each of the front and rear antenna states, and the time equivalent to 1,000 samples is set for switching between the front and rear antenna states and for switching between phase states, the data acquisition time required to acquire data once in all the combination states is 9.6 msec.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first pulse received signal passes is made to be the same as that through which the second pulse received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. Further, because even when the phase rotation linearity characteristics of each orthogonal detector are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. The pulse transmission signal emitted from the transmitting antenna does not have to be a pulse signal as long as the phase difference can be detected from the one-time reflected component.

Embodiment 11

Figure 18:
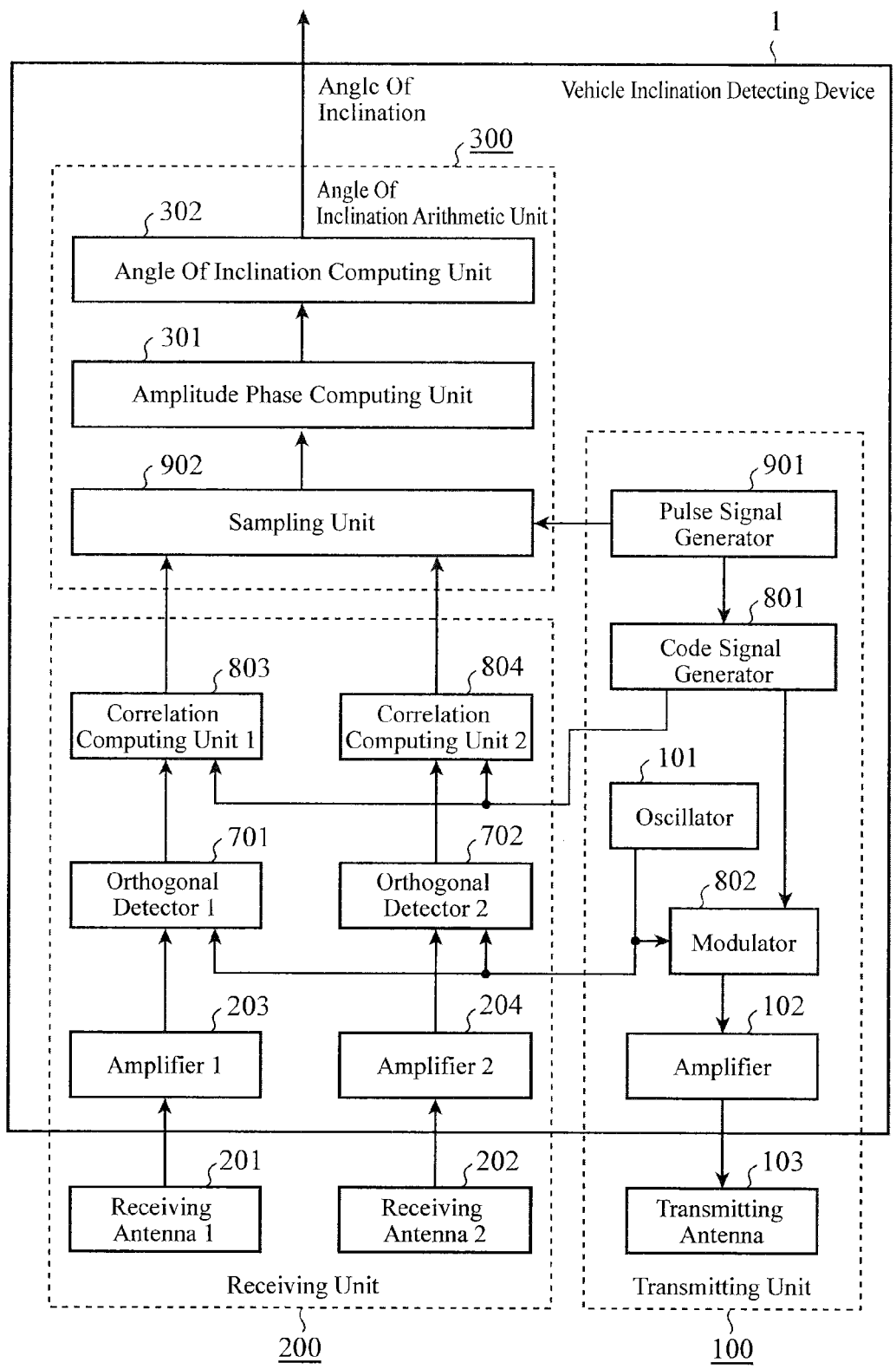
FIG. 18 is a block diagram of a vehicle inclination detecting device in accordance with Embodiment 11 of the present invention.

FIG. 18 is a block diagram showing the structure of a vehicle inclination detecting device 1 in accordance with Embodiment 11 of the present invention. This vehicle inclination detecting device 1 has a structure of combining such a structure of using a code signal as shown in above-mentioned Embodiment 4 (shown in FIG. 8) with that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a code signal generator 801, a modulator 802, an oscillator 101, an amplifier 102, and a transmitting antenna 103. The receiving unit 200 includes a first receiving antenna 201, a second receiving antenna 202, a first amplifier 203, a second amplifier 204, a first orthogonal detector 701, a second orthogonal detector 702, a first correlation computing unit 803, and a second correlation computing unit 804. The angle of inclination arithmetic unit 300 includes a sampling unit 902, an amplitude phase computing unit 301, and an angle of inclination computing unit 302.

Next, the operation of the vehicle inclination detecting device will be explained. The modulator 802 in the transmitting unit 100 modulates an oscillating signal having a predetermined frequency which the oscillator 101 outputs with a code signal according to a predetermined code or an ID which the code signal generator 801 outputs and a series of pulses which the pulse signal generator 901 outputs to generate a pulse transmission signal. This pulse transmission signal is outputted to the transmitting antenna 103 by way of the amplifier 102, and is emitted as a radio wave from the transmitting antenna 103.

The first receiving antenna 201 receives the radio wave emitted from the transmitting unit 100, and outputs the radio wave as a first pulse received signal. The first amplifier 203 carries out power amplification on the first pulse received signal up to a predetermined level, and outputs the first pulse received signal amplified thereby to the first orthogonal detector 701. The first orthogonal detector 701 carries out orthogonal detection (IQ detection) on the oscillating signal from the oscillator 101 in the transmitting unit 100 and the first pulse received signal to output an IQ signal (first pulse IQ signal) of a first baseband signal to the first correlation computing unit 803. The first correlation computing unit 803 carries out a correlation operation on the first IQ signal and the code signal from the code signal generator 801 to output the amplitude and the phase of a first pulse correlation value to the angle of inclination arithmetic unit 300.

Similarly, the second receiving antenna 202 receives the radio wave emitted from the transmitting unit 100, and outputs the radio wave as a second pulse received signal. The second amplifier 204 carries out power amplification on the second pulse received signal up to a predetermined level, and outputs the second pulse received signal to the second orthogonal detector 702. The second orthogonal detector 701 carries out orthogonal detection (IQ detection) on the oscillating signal from the oscillator 101 in the transmitting unit 100 and the second pulse received signal to output an IQ signal (second pulse IQ signal) of a second baseband signal to the second correlation computing unit 804. The second correlation computing unit 804 carries out a correlation operation on the second IQ signal and the code signal from the code signal generator 801 to output the amplitude and the phase of a second pulse correlation value to the angle of inclination arithmetic unit 300.

The sampling unit 902 in the angle of inclination arithmetic unit 300 samples the amplitude and the phase of the first pulse correlation value and those of the second pulse correlation value in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse correlation values in time chronological to acquire the amplitude and the phase of the reflected wave. The amplitude phase computing unit 301 then derives a phase difference from the amplitudes and the phases of one-time reflected components of the first and second pulse correlation values, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy. The pulse transmission signal emitted from the transmitting antenna does not have to be a pulse signal as long as the phase difference can be detected from the one-time reflected component.

Embodiment 12

Figure 19:
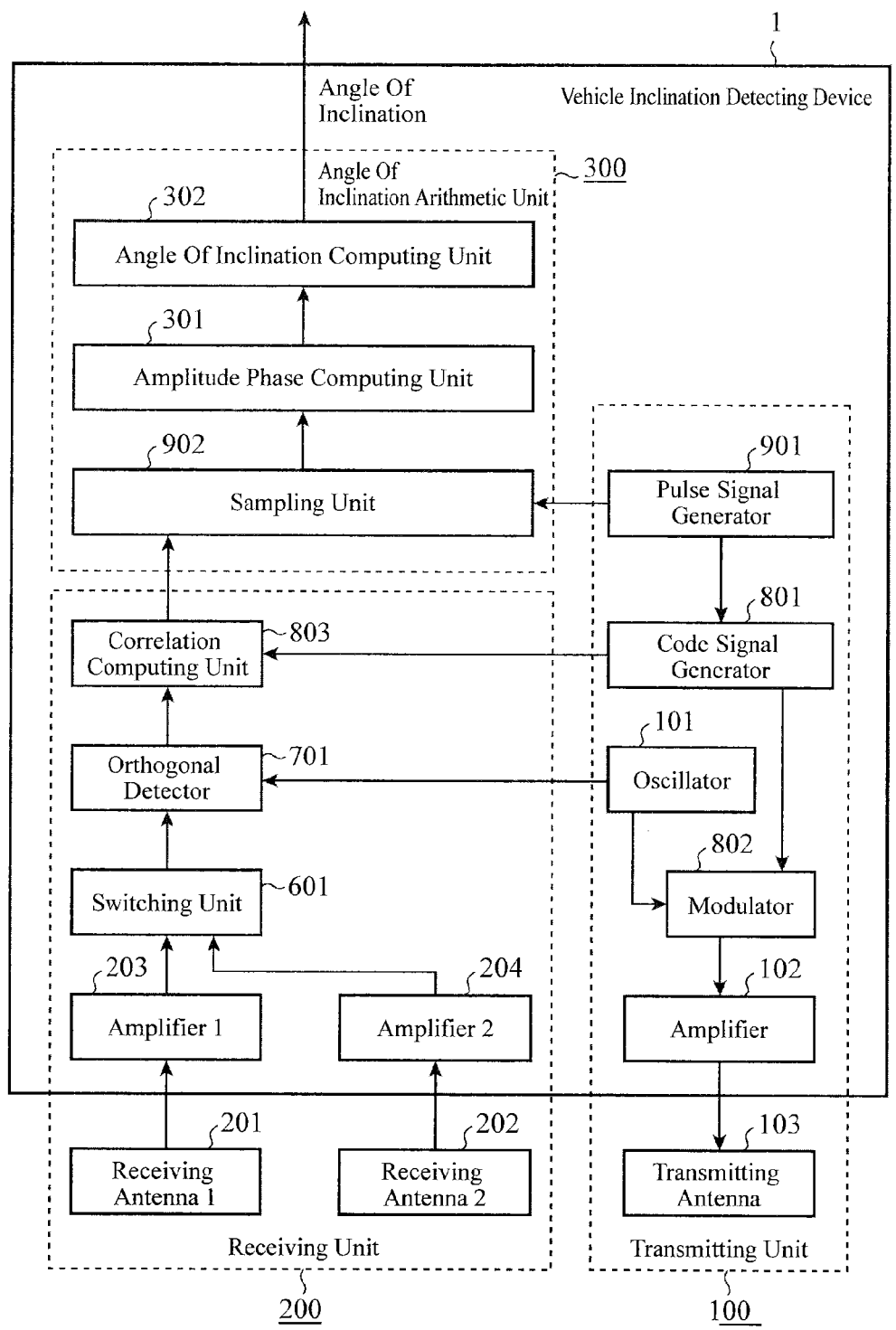
FIG. 19 is a block diagram of a vehicle inclination detecting device in accordance with Embodiment 12 of the present invention.

FIG. 19 is a block diagram showing the structure of a vehicle inclination detecting device 1 in accordance with Embodiment 12 of the present invention. This vehicle inclination detecting device 1 has a structure of combining the structure in accordance with above-mentioned Embodiment 4 (shown in FIG. 8), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a code signal generator 801, a modulator 802, an oscillator 101, an amplifier 102, and a transmitting antenna 103. The receiving unit 200 includes a first receiving antenna 201, a second receiving antenna 202, a first amplifier 203, a second amplifier 204, a switching unit 601, an orthogonal detector 701, and a correlation computing unit 803. The angle of inclination arithmetic unit 300 includes a sampling unit 902, an amplitude phase computing unit 301, and an angle of inclination computing unit 302.

Next, the operation of the vehicle inclination detecting device will be explained. The modulator 802 in the transmitting unit 100 modulates an oscillating signal having a predetermined frequency which the oscillator 101 outputs with a code signal according to a predetermined code or an ID which the code signal generator 801 outputs and a series of pulses which the pulse signal generator 901 outputs to generate a pulse transmission signal. The pulse transmission signal is outputted to the transmitting antenna 103 by way of the amplifier 102, and is emitted as a radio wave from the transmitting antenna 103.

The receiving unit 200 receives the radio wave emitted from the transmitting antenna by way of the first receiving antenna 201 and the second receiving antenna 202 to acquire a first pulse received signal and a second pulse received signal. The pulse received signals are inputted to the switching unit 601 by way of the first and second amplifiers 203 and 204, respectively. The switching unit alternately switches between the pulse received signals to alternately input the pulse received signals to the orthogonal detector 701. The orthogonal detector 701 carries out orthogonal detection on the first pulse received signal or the second pulse received signal and the oscillating signal from the oscillator 101 to compute a first pulse baseband signal or a second pulse baseband signal, and outputs the first pulse baseband signal or the second pulse baseband signal to the correlation computing unit 803. The correlation computing unit 803 carries out a correlation operation on the first pulse baseband signal or the second pulse baseband signal and the code signal from the code signal generator 801 to acquire the amplitude and the phase of a first pulse correlation value or a second pulse correlation value, and outputs the amplitude and the phase of the first pulse correlation value or the second pulse correlation value to the angle of inclination arithmetic unit 300.

The sampling unit 902 in the angle of inclination arithmetic unit 300 alternately samples the amplitude and the phase of the first pulse correlation value and those of the second pulse correlation value in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse correlation values in time chronological to acquire the amplitude and the phase of the reflected wave. The amplitude phase computing unit 301 then derives a phase difference from the amplitudes and the phases of one-time reflected components of the first and second pulse correlation values, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first pulse received signal passes is made to be the same as that through which the second pulse received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy. The pulse transmission signal emitted from the transmitting antenna does not have to be a pulse signal as long as the phase difference can be detected from the one-time reflected component.

Embodiment 13

Figure 20:
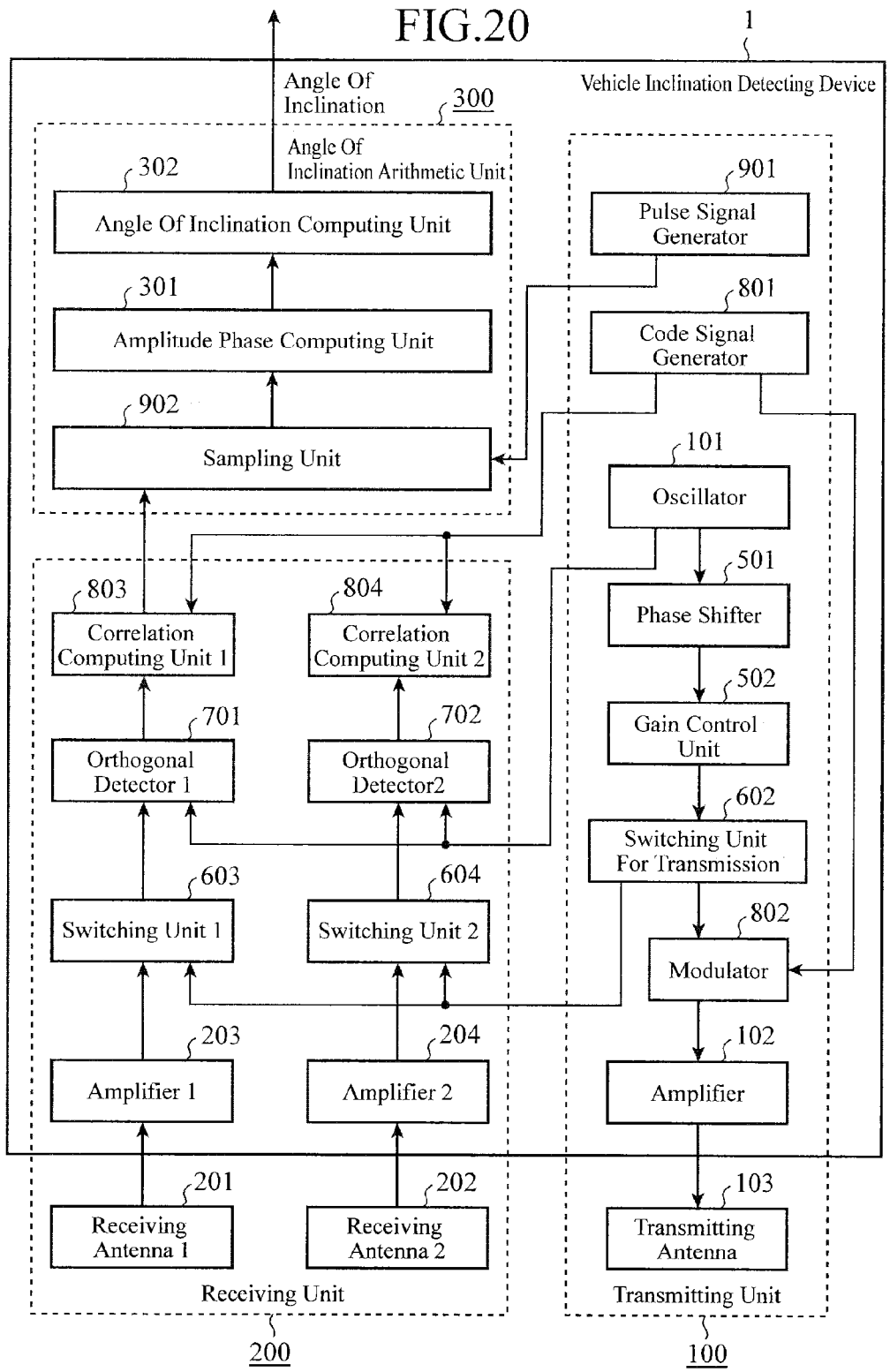
FIG. 20 is a block diagram of a vehicle inclination detecting device in accordance with Embodiment 13 of the present invention.

FIG. 20 is a block diagram showing the structure of a vehicle inclination detecting device 1 in accordance with Embodiment 13 of the present invention. This vehicle inclination detecting device 1 has a structure of combining the structure in accordance with above-mentioned Embodiment 5 (shown in FIG. 9), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a code signal generator 801, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 603, a second switching unit 604, a first orthogonal detector 701, a second orthogonal detector 702, a first correlation computing unit 803, and a second correlation computing unit 804. The angle of inclination arithmetic unit 300 includes a sampling unit 902, an amplitude phase computing unit 301, and an angle of inclination computing unit 302.

Next, the operation of the vehicle inclination detecting device will be explained. In the transmitting unit 100, an oscillating signal having a predetermined frequency which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the first switching unit 602. The modulator 802 carries out pulse modulation on this transmission signal with a code signal according to a predetermined code or an ID from the code signal generator 801 and a series of pulses which the pulse signal generator 901 outputs to generate a pulse transmission signal, and outputs the pulse transmission signal to the transmitting antenna 103 by way of the amplifier 102. A method of rotating the phase using the phase shifter 501 can be implemented in an analog way or in a digital way, and the phase of the oscillating signal is rotated by one cycle (360 degrees). The pulse transmission signal is emitted as a radio wave from the transmitting antenna 103.

The first receiving antenna 201 receives the radio wave emitted from the transmitting unit 100, and outputs the radio wave as a first pulse received signal. The first amplifier 203 carries out power amplification on the first pulse received signal up to a predetermined level, and outputs the first pulse received signal amplified thereby to the first orthogonal detector 701 byway of the first switching unit 603. The first orthogonal detector 701 carries out orthogonal detection (IQ detection) on the oscillating signal from the oscillator 101 in the transmitting unit 100 and the first pulse received signal to output an IQ signal (first pulse IQ signal) of a first pulse baseband signal to the first correlation computing unit 803. The first correlation computing unit 803 carries out a correlation operation on the first pulse IQ signal and the code signal from the code signal generator 801 to output the amplitude and the phase of a first pulse correlation value to the angle of inclination arithmetic unit 300.

Similarly, the second receiving antenna 202 receives the radio wave emitted from the transmitting unit 100, and outputs the radio wave as a second pulse received signal. The second amplifier 204 carries out power amplification on the second pulse received signal up to a predetermined level, and outputs the second pulse received signal to the second orthogonal detector 702 by way of the second switching unit 604. The second orthogonal detector 702 carries out orthogonal detection (IQ detection) on the oscillating signal from the oscillator 101 in the transmitting unit 100 and the second pulse received signal to output an IQ signal (second pulse IQ signal) of a second pulse baseband signal to the second correlation computing unit 804. The second correlation computing unit 804 carries out a correlation operation on the second pulse IQ signal and the code signal from the code signal generator 801 to output the amplitude and the phase of a second pulse correlation value to the angle of inclination arithmetic unit 300.

Further, as an operation different from the above-mentioned operation, the switching unit 602 for transmission inputs the transmission signal whose phase is rotated to the first orthogonal detector 701 and the second orthogonal detector 702 by way of the first switching unit 603 and the second switching unit 604 to cause the first orthogonal detector and the second orthogonal detector to carry out orthogonal detection (IQ detection) on the oscillating signal from the oscillator 101 in the transmitting unit 100 and the transmission signal to generate and input an IQ signal (third pulse IQ signal) of a third pulse baseband signal and an IQ signal (fourth pulse IQ signal) of a fourth pulse baseband signal to the first correlation computing unit 803 and the second correlation computing unit 804, respectively. The first and second correlation computing units 803 and 804 do not carry out correlation operations on the third pulse IQ signal and the fourth pulse IQ signal with the code signal from the code signal generator 801, respectively, and output the third pulse IQ signal and the fourth pulse IQ signal to the angle of inclination arithmetic unit 300 as the amplitude and the phase of a third pulse correlation value and those of a fourth pulse correlation value, respectively.

The sampling unit 902 in the angle of inclination arithmetic unit 300 acquires the amplitude and the phase of the third pulse correlation value and those of the fourth pulse correlation value in synchronization with the pulse signal from the pulse signal generator 901 in the transmitting unit 100. The amplitude phase computing unit 301 acquires the phase rotation linearity characteristics of the first orthogonal detector 701 and those of the second orthogonal detector 702 from the amplitude and the phase of the third pulse correlation value and those of the fourth pulse correlation value, which the sampling unit 902 samples and acquires, and prepares self-calibration data used for correcting the phase rotation linearity characteristics to normal phase rotation characteristics. The amplitude phase computing unit derives a phase difference from the amplitude and the phase of the first correlation value and those of the second correlation value with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the first and second orthogonal detectors 701 and 702, and the correction of the phase rotation linearity characteristics to the normal phase rotation characteristics by the amplitude phase computing unit 301 are the same as those shown in FIG. 6 explained in above-mentioned Embodiment 2.

In general, in the angle of inclination arithmetic unit 300, the sampling unit 902 alternately samples the amplitude and the phase of the first pulse correlation value and those of the second correlation value in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse correlation values in time chronological to acquire the amplitude and the phase of the reflected wave. The amplitude phase computing unit 301 then derives a phase difference from the amplitudes and the phases of one-time reflected components of the first and second pulse correlation values, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because even when the phase rotation linearity characteristics are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy. The pulse transmission signal emitted from the transmitting antenna does not have to be a pulse signal as long as the phase difference can be detected from the one-time reflected component.

Embodiment 14

Figure 21:
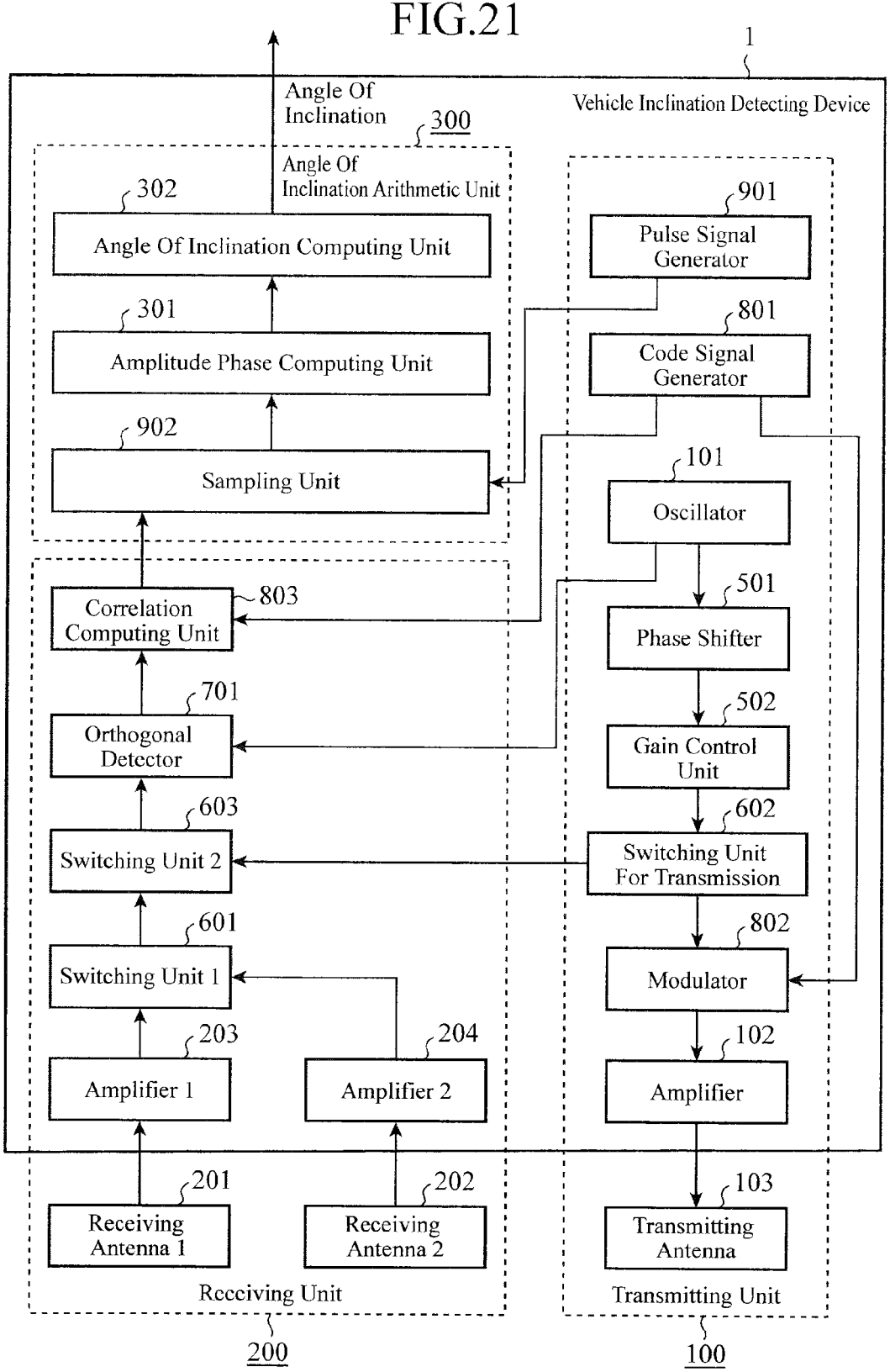
FIG. 21 is a block diagram of a vehicle inclination detecting device in accordance with Embodiment 14 of the present invention.

FIG. 21 is a block diagram showing the structure of a vehicle inclination detecting device 1 in accordance with Embodiment 14 of the present invention. This vehicle inclination detecting device 1 has a structure of combining the structure in accordance with above-mentioned Embodiment 6 (shown in FIG. 10), and that in accordance with above-mentioned Embodiment 7 (shown in FIG. 11), and includes a transmitting unit 100, a receiving unit 200, and an angle of inclination arithmetic unit 300. The transmitting unit 100 includes a pulse signal generator 901, a code signal generator 801, a modulator 802, an oscillator 101, a phase shifter 501, a gain control unit 502, a switching unit 602 for transmission, an amplifier 102, and a transmitting antenna 103. The receiving unit 200 includes a first receiving antenna 201, a second receiving antenna 202, a first amplifier 203, a second amplifier 204, a first switching unit 601, a second switching unit 603, an orthogonal detector 701, and a correlation computing unit 803.

Next, the operation of the vehicle inclination detecting device will be explained. In the transmitting unit 100, an oscillating signal having a predetermined frequency which the oscillator 101 outputs is converted into a transmission signal whose phase is rotated by the phase shifter 501. The gain control unit 502 sets the level of the transmission signal to a predetermined level, and outputs the transmission signal to the modulator 802 by way of the first switching unit 602. The modulator 802 carries out pulse modulation on this transmission signal with a code signal according to a predetermined code or an ID from the code signal generator 801 and a series of pulses which the pulse signal generator 901 outputs to generate a pulse transmission signal, and outputs the pulse transmission signal to the transmitting antenna 103 by way of the amplifier 102. A method of rotating the phase using the phase shifter 501 can be implemented in an analog way or in a digital way, and the phase of the oscillating signal is rotated by one cycle (360 degrees). The pulse transmission signal is emitted as a radio wave from the transmitting antenna 103.

The receiving unit 200 receives the radio wave emitted from the transmitting antenna by way of the first receiving antenna 201 and the second receiving antenna 202 to acquire a first pulse received signal and a second pulse received signal. The pulse received signals are power-amplified up to a predetermined level by the first and second amplifiers 203 and 204, respectively, and are inputted to the first switching unit 601. The first switching unit alternately switches between the pulse received signals to alternately input the pulse received signals to the orthogonal detector 701 by way of the second switching unit 603. The orthogonal detector 701 carries out orthogonal detection (IQ detection) on the first pulse received signal or the second pulse received signal and the oscillating signal from the oscillator 101 to compute an IQ signal of a first pulse baseband signal or an IQ signal of a second pulse baseband signal (a first pulse IQ signal or a second pulse IQ signal), and outputs the first pulse baseband signal or the second pulse baseband signal to the correlation computing unit 803. The correlation computing unit 803 carries out a correlation operation on the first pulse baseband signal or the second pulse baseband signal and the code signal from the code signal generator 801 to acquire the amplitude and the phase of a first pulse correlation value or the amplitude and the phase of a second pulse correlation value, and outputs the amplitude and the phase of the first pulse correlation value or the second pulse correlation value to the angle of inclination arithmetic unit 300.

Further, as an operation different from the above-mentioned operation, the switching unit 602 for transmission inputs the transmission signal whose phase is rotated to the orthogonal detector 701 by way of the second switching unit 603, and the orthogonal detector carries out orthogonal detection (IQ detection) on the oscillating signal from the oscillator 101 in the transmitting unit 100 and the transmission signal to output an IQ signal (third pulse IQ signal) of a third pulse baseband signal to the correlation computing unit 803. The correlation computing unit 803 does not carry out a correlation operation on the third pulse IQ signal with the code signal from the code signal generator 801, and outputs the third pulse IQ signal to the angle of inclination arithmetic unit 300 as the amplitude and the phase of a third pulse correlation value.

The sampling unit 902 in the angle of inclination arithmetic unit 300 samples and acquires the amplitude and the phase of third pulse correlation value in synchronization with the pulse signal from the pulse signal generator 901 in the transmitting unit 100. The amplitude phase computing unit 301 acquires the phase rotation linearity characteristics of the orthogonal detector 701 from the amplitude and the phase of the third pulse correlation value, which the sampling unit 902 samples and acquires, and prepares self-calibration data used for correcting the phase rotation linearity characteristics to normal phase rotation characteristics. The amplitude phase computing unit derives a phase difference from the amplitude and the phase of the first pulse correlation value and those of the second pulse correlation value with reference to this self-calibration data. The angle of inclination computing unit 302 computes the angle of inclination of the vehicle from this phase difference. The angle of inclination computing unit can use an average of the phase differences in one cycle which are acquired for phase states of the transmission signal whose phase is rotated for the calculation of the angle of inclination. As an alternative, the angle of inclination computing unit can use the phase difference in a predetermined phase state from among the phase differences which are acquired for the phase states of the transmission signal whose phase is rotated for the calculation of the angle of inclination. The phase rotation linearity characteristics of the orthogonal detector 701, and the correction of the phase rotation linearity characteristics to the normal phase rotation characteristics by the amplitude phase computing unit 301 are the same as those shown in FIG. 6 explained in above-mentioned Embodiment 2.

In general, in the angle of inclination arithmetic unit 300, the sampling unit 902 alternately samples the amplitude and the phase of the first pulse correlation value and those of the second pulse correlation value in time sequence in synchronization with the pulse signal from the pulse signal generator 901 in the transmitting unit 100, and separates the amplitude and the phase of a reflected wave reflected a predetermined number of times from the road surface from reflected radio waves each reflected two or more times from the road surface which are piggybacked onto each of the first and second pulse correlation values in time chronological to acquire the amplitude and the phase of the reflected wave. The amplitude phase computing unit 301 then derives a phase difference from the amplitudes and the phases of one-time reflected components of the first and second pulse correlation values, and the angle of inclination computing unit 302 computes the angle of inclination of the vehicle from this phase difference.

The vehicle inclination detecting device can use a relatively-high-speed AD converter or a relatively-low-speed AD converter as the sampling unit 902, like that according to above-mentioned Embodiment 7. When using a relatively-low-speed AD converter, the vehicle inclination detecting device carries out the same operation as that explained with reference to FIG. 13 in above-mentioned Embodiment 7.

As mentioned above, the vehicle inclination detecting device 1 provides an advantage of being able to detect a variation in the radio wave propagation path which varies according to the inclination of the vehicle as a variation in the phase difference with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device computes the angle of inclination of the vehicle from the phases of the IQ signals even if the received signal levels vary, the vehicle inclination detecting device provides an advantage of being able to detect the angle of inclination of the vehicle with a high degree of accuracy. In addition, because a single line is provided between the switching unit 601 and the orthogonal detector 701, and hence the phase length through which the first pulse received signal passes is made to be the same as that through which the second pulse received signal passes in the line from the switching unit 601 to the orthogonal detector 701, the vehicle inclination detecting device provides an advantage of being able to detect the angle of inclination of the vehicle with a high degree of accuracy. Further, because by carrying out the orthogonal detection using the single orthogonal detector, the vehicle inclination detecting device can prevent an error from occurring due to a variation in the characteristics of each orthogonal detector, such as variations in the amplitude and the phase of each signal acquired by each orthogonal detector, the vehicle inclination detecting device provides an advantage of being able to detect the angle of inclination of the vehicle with a high degree of accuracy. In addition, because even when the phase rotation linearity characteristics are not good, the vehicle inclination detecting device can correct the phase rotation linearity characteristics with reference to the self-calibration data, the vehicle inclination detecting device provides an advantage of being able to detect the angle of inclination of the vehicle with a high degree of accuracy. Further, the vehicle inclination detecting device provides an advantage of being able to detect the angle of inclination of the vehicle with a high degree of accuracy even if a plurality of reflection waves are reflected from a road surface. In addition, because the vehicle inclination detecting device carries out code modulation on the transmission signal, and can therefore reduce errors due to phase interference even if each receiving antenna receives radio waves having the same frequency, such as a radio wave emitted from a radar device for vehicle and a radio wave emitted from another device, the vehicle inclination detecting device provides an advantage of being able to detect the angle of inclination of the vehicle with a high degree of accuracy. The pulse transmission signal emitted from the transmitting antenna does not have to be a pulse signal as long as the phase difference can be detected from the one-time reflected component.

Embodiment 15

Figure 22:
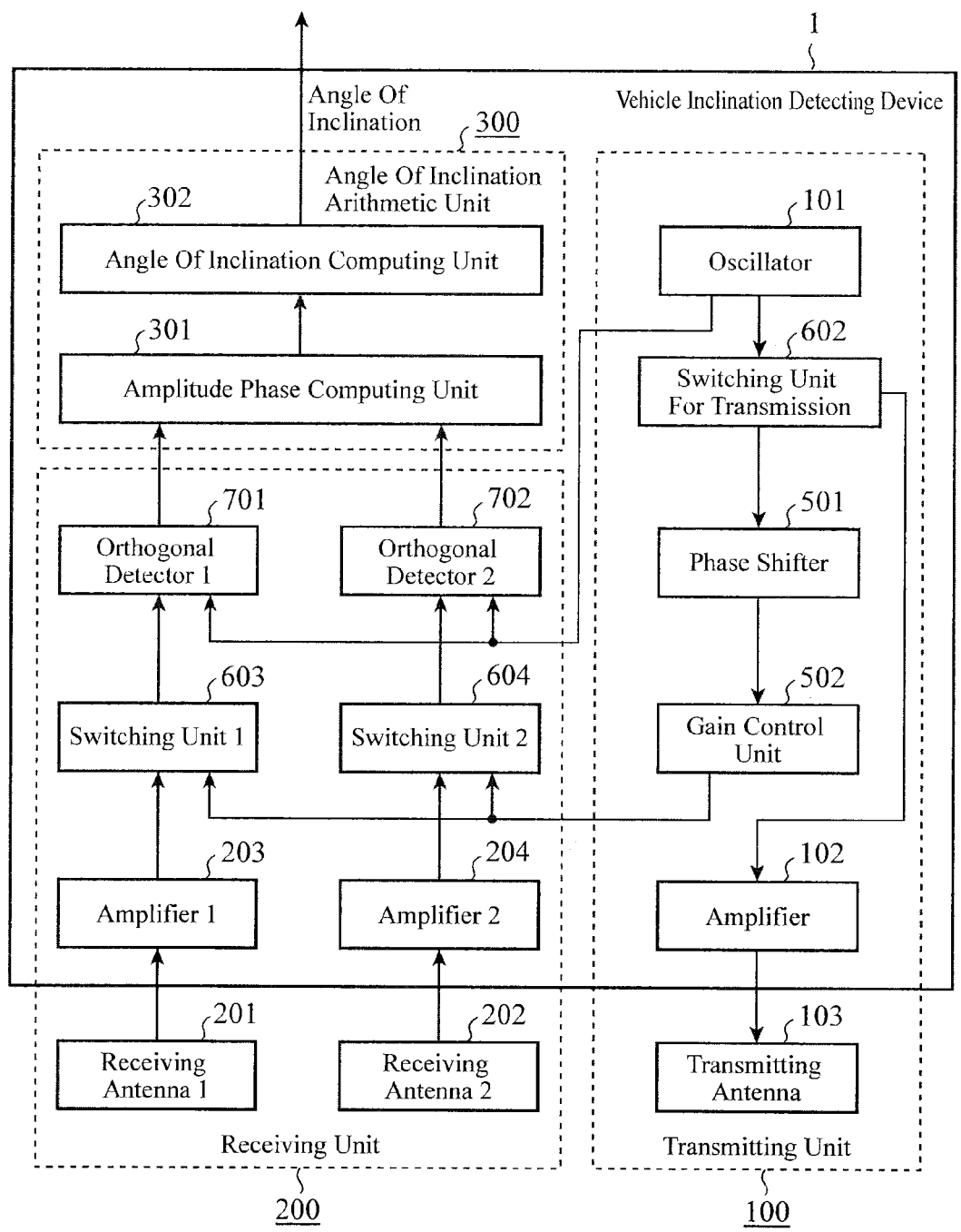
FIG. 22 is a block diagram of a vehicle inclination detecting device in accordance with Embodiment 15 of the present invention.

FIG. 22 is a block diagram showing the structure of a vehicle inclination detecting device 1 in accordance with Embodiment 15 of the present invention. In above-mentioned Embodiment 2, the example of inputting the transmission signal whose phase is rotated to the transmitting antenna 103 is shown. The transmission signal inputted to the transmitting antenna 103 can be a signal whose phase is not rotated. As shown in FIG. 22, the vehicle inclination detecting device 1 according to Embodiment 15 inputs an output of an oscillator 101 to a switching unit 602 for transmission. One of two outputs of the switching unit 602 for transmission is inputted to a transmitting antenna 103 by way of an amplifier 102, and is used for measurement of the angle of inclination of a vehicle. Further, the other output of the switching unit is inputted to a phase shifter 501, and an output of the phase shifter 501 is inputted to a first switching unit 603 and a second switching unit 604 by way of a gain control unit 502 and is used for acquisition of the phase rotation linearity characteristics. Even in this example, the vehicle inclination detecting device can provide the same advantages as those provided by Embodiment 2.

Also in any of above-mentioned Embodiments 3, 5, 6, 9, 10, 13 and 14, by doing in the above-mentioned way, the vehicle inclination detecting device can measure the angle of inclination of the vehicle by using the transmission signal whose phase is not rotated while being able to acquire the phase rotation linearity characteristics by using the transmission signal whose phase is rotated.

Embodiment 16

Figure 23:
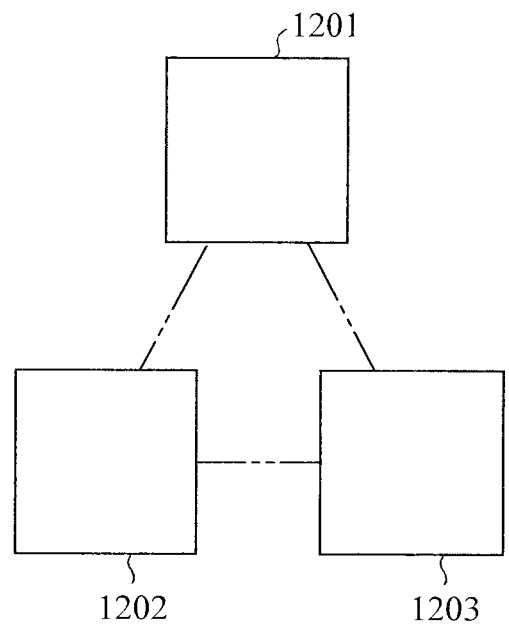
FIG. 23 is a diagram showing the configuration of an antenna arrangement of a vehicle inclination detecting device in accordance with Embodiment 16 of the present invention.

FIG. 23 is a diagram showing the configuration of an antenna arrangement of a vehicle inclination detecting device according to the present invention. A first receiving antenna 1202 and a second receiving antenna 1203 are placed at the vertices of the base of an isosceles triangle, respectively, and a transmitting antenna 1201 is placed at the remaining vertex.

Figure 24:
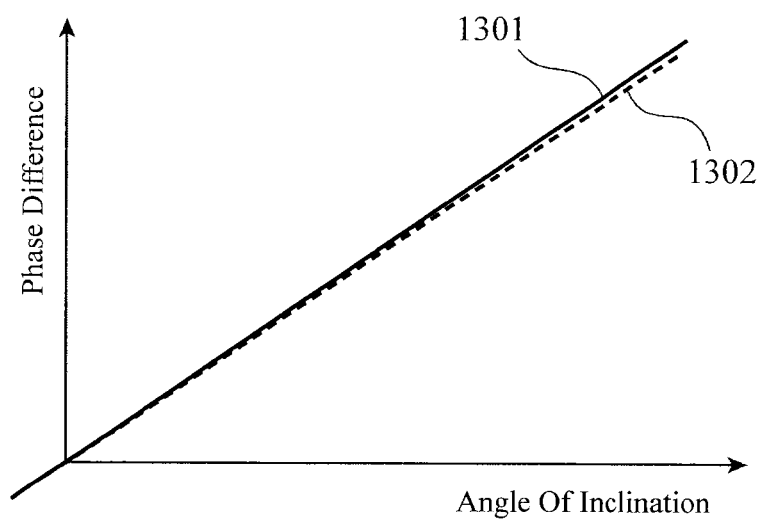
FIG. 24 is an explanatory drawing explaining a relationship among an angle of inclination, a phase difference, and the levels of antennas in accordance with Embodiment 16 of the present invention when the antennas are arranged in a triangular shape.

FIG. 24 is an explanatory drawing explaining a relationship among the angle of inclination of a vehicle, a phase difference, and the levels of the antennas according to the present invention when the antennas are arranged in the triangular shape. More specifically, FIG. 24 is a diagram showing a relationship between the angle of inclination of the vehicle and the phase difference at the time of the antenna arrangement shown in FIG. 23. A straight line 1301 in FIG. 24 shows a relationship between the angle of inclination of the vehicle and the phase difference when the vehicle height or the level of each antenna is high, and a dashed line 1302 shows a relationship between the angle of inclination of the vehicle and the phase difference when the vehicle height or the level of each antenna is low. Even if the level of each antenna varies, the relationship between the angle of inclination of the vehicle and the phase difference does not vary.

Figure 25:
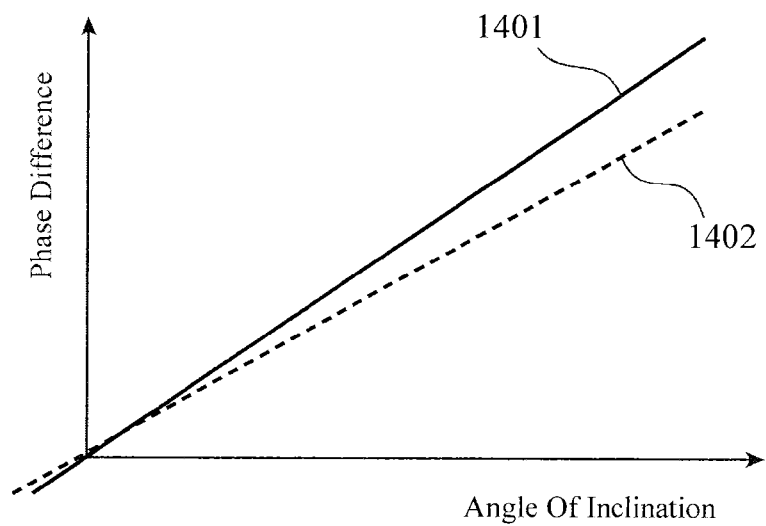
FIG. 25 is a diagram showing a relationship between the angle of inclination and the phase difference when a transmitting antenna and receiving antennas in accordance with Embodiment 16 of the present invention are aligned in a straight line.

FIG. 25 is a diagram showing a relationship between the angle of inclination of the vehicle and the phase difference when the transmitting antenna and the receiving antennas are aligned in a straight line. Although not illustrated, in this embodiment, the transmitting antenna, the first receiving antenna, and the second receiving antenna are aligned in a straight line with the transmitting antenna being centered among them. A straight line 1401 in FIG. 25 shows a relationship between the angle of inclination of the vehicle and the phase difference when the vehicle height or the level of each antenna is high, and a dashed line 1402 shows a relationship between the angle of inclination of the vehicle and the phase difference when the vehicle height or the level of each antenna is low. When the level of each antenna varies, the phase difference differs even though the same angle of inclination is provided.

Further, although the case where the antennas are arranged at the vertices of an isosceles triangle is shown in FIG. 23, the same results are produced even when the transmitting antenna, the first receiving antenna, and the second receiving antenna are arranged at the vertices of an equilateral triangle.

The transmitting unit, the receiving unit, and so on have only to have such a structure as described in either one of above-mentioned Embodiments 1 to 15.

As mentioned above, the vehicle inclination detecting device provides an advantage of being able to detect a variation in the radio wave propagation distance which varies according to the inclination of the vehicle as a variation in the phase with a high degree of accuracy, and can therefore compute the vehicle inclination angle with a high degree of accuracy. Further, the vehicle inclination detecting device provides an advantage of being able to detect the angle of inclination of the vehicle with a high degree of accuracy even if a temperature change occurs or a wind is blowing. In addition, the vehicle inclination detecting device provides an advantage of being able to detect the angle of inclination of the vehicle with a high degree of accuracy without being affected by engine noise or the like. Further, because the vehicle inclination detecting device can reduce variations in the phase difference due to variations in the vehicle height more effectively when the antennas are arranged at the vertices of an isosceles triangle than when the antennas are aligned in a straight line, the vehicle inclination detecting device provides an advantage of being able to compute the angle of inclination of the vehicle with a high degree of accuracy.

Embodiment 17

Figure 26:
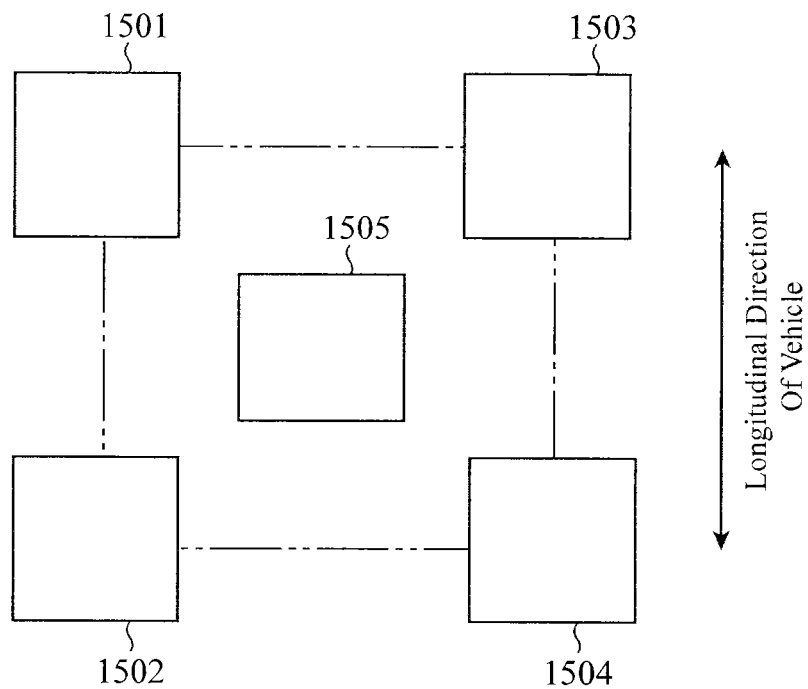
FIG. 26 is a diagram showing the configuration of an antenna arrangement of a vehicle inclination detecting device in accordance with Embodiment 17 of the present invention.

FIG. 26 is a diagram showing the configuration of an antenna arrangement of a vehicle inclination detecting device in accordance with Embodiment 17 of the present invention. This figure shows an example of the embodiment in a case of using three or more receiving antennas. A first receiving antenna 1501, a second receiving antenna 1502, a third receiving antenna 1503, and a fourth receiving antenna 1504 are arranged at the vertices of a rectangle, respectively, and a transmitting antenna 1505 is placed at a point of intersection of the diagonal lines of this rectangle. It is assumed that the first through fourth receiving antennas are arranged in such a way that a straight line connecting between the first receiving antenna 1501 and the second receiving antenna 1502 is approximately parallel to a longitudinal direction of a vehicle, and a straight line connecting between the first receiving antenna 1501 and the third receiving antenna 1503 is approximately parallel to a lateral direction (direction of the width) of the vehicle. In a case in which a receiving unit has four receiving antennas, the receiving antennas are arranged at the vertices of a rectangle with the transmitting antenna being centered among them.

Figure 27:
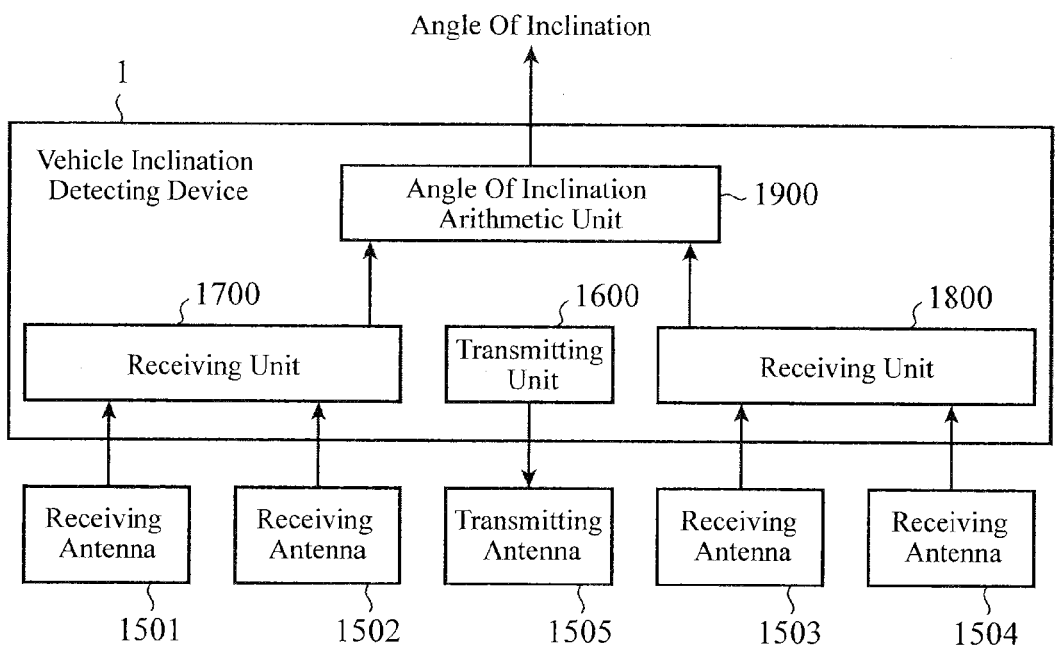
FIG. 27 is a block diagram showing the structure of the vehicle inclination detecting device in accordance with Embodiment 17 of the present invention.

FIG. 27 is the block diagram showing the structure of the vehicle inclination detecting device 1 in accordance with Embodiment 17 of the present invention. A transmitting unit 1600 receives a radio wave from the transmitting antenna 1505, and a receiving unit 1700 outputs the amplitude and the phase which the receiving unit computes from a received signal received by the first receiving antenna 1501 and the amplitude and the phase which the receiving unit computes from a received signal received by the second receiving antenna 1502 to an angle of inclination arithmetic unit 1900. A receiving unit 1800 outputs the amplitude and the phase which the receiving unit computes from a received signal received by the third receiving antenna 1503 and the amplitude and the phase which the receiving unit computes from a received signal received by the fourth receiving antenna 1504 to the angle of inclination arithmetic unit 1900.

In a case in which the vehicle inclination detecting device includes three or more receiving antennas, the angle of inclination arithmetic unit computes the angle of inclination of the vehicle by further using received signals other than received signals received by the first receiving antenna and the second receiving antenna. For example, the vehicle inclination detecting device carries out subsequent processes on the third received signal received by the third receiving antenna in the same way that the vehicle inclination detecting device carries out the processes on the first received signal. In this case, the vehicle inclination detecting device can carry out the subsequent processes on every of combinations of all the receiving antennas or can use a part of the combinations.

The transmitting unit 1600 has a structure as described in either of above-mentioned Embodiments 1 to 15. Further, each of the receiving units 1700 and 1800 has a structure as described in either of above-mentioned Embodiments 1 to 15. An amplitude phase computing unit (not shown) in the angle of inclination arithmetic unit 1900 computes the angle of inclination of the vehicle from the average of a phase difference computed by the receiving unit 1700 and a phase difference computed by the receiving unit 1800.

Figure 28:
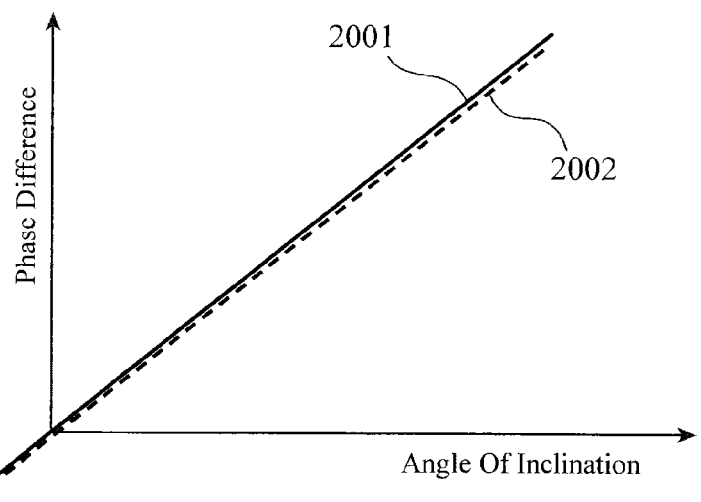
FIG. 28 is a diagram explaining a relationship between an angle of inclination in a longitudinal direction and a phase difference in the vehicle inclination detecting device in accordance with Embodiment 17 of the present invention.
Figure 29:
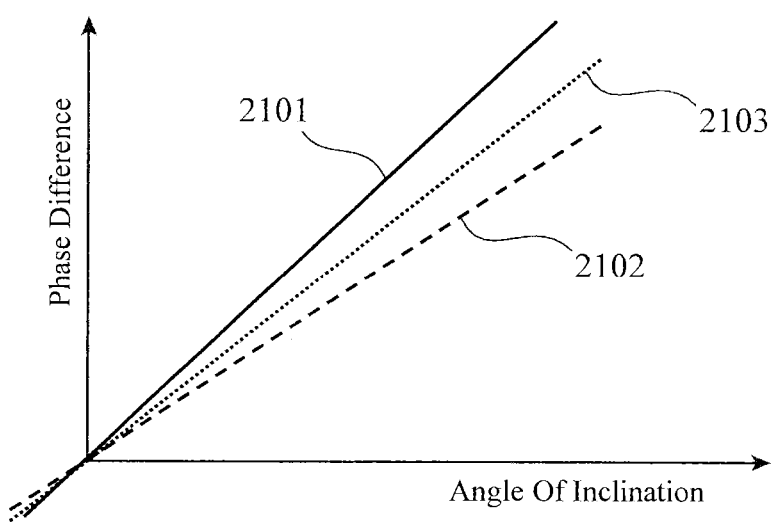
FIG. 29 is a diagram explaining a relationship between the angle of inclination in a longitudinal direction and the phase difference in the vehicle inclination detecting device in accordance with Embodiment 17 of the present invention.

FIGS. 28 and 29 are diagrams for explaining a relationship between the angle of inclination of the vehicle in a longitudinal direction and the phase difference in the vehicle inclination detecting device in accordance with Embodiment 17 of the present invention. Concretely, FIG. 28 shows a relationship between the angle of inclination of the vehicle in a longitudinal direction and the phase difference when the vehicle does not incline in a lateral direction. A solid line 2001 in FIG. 28 shows a value computed by the receiving unit 1700, a dashed line 2002 in FIG. 28 shows a value computed by the receiving unit 1800, and the solid line 2001 matches the dashed line 2002. Further, FIG. 29 shows a relationship between the angle of inclination of the vehicle in a longitudinal direction and the phase difference when the vehicle inclines in a lateral direction. A solid line 2101 in FIG. 29 shows a value computed by the receiving unit 1700, a dashed line 2102 in FIG. 29 shows a value computed by the receiving unit 1800, and the solid line 2101 does not match the dashed line 2102. A dotted line 2103 is a straight line computed from the average of the solid line 2101 and the dashed line 2102, and matches the solid line 2001 and the dashed line 2002 which are acquired when the vehicle does not incline in a lateral direction.

Further, the angle of inclination arithmetic unit 1900 similarly computes the angle of inclination of the vehicle in a lateral direction from the amplitudes and the phases which are acquired from the received signals respectively received by the first receiving antenna 1501 and the third receiving antenna 1503, and the amplitudes and the phases which are acquired from the received signals respectively received by the second receiving antenna 1502 and the fourth receiving antenna 1504. Further, the angle of inclination arithmetic unit can simultaneously compute the angle of inclination of the vehicle in a longitudinal direction and that in a lateral direction by simultaneously carrying out the above-mentioned signal processing.

As mentioned above, the vehicle inclination detecting device provides an advantage of being able to compute the inclination of the vehicle in a longitudinal direction with a high degree of accuracy without being affected by the inclination of the vehicle in a lateral direction. Further, the vehicle inclination detecting device provides an advantage of being able to compute the inclination of the vehicle in a lateral direction with a high degree of accuracy without being affected by the inclination of the vehicle in a longitudinal direction. In addition, the vehicle inclination detecting device provides an advantage of being able to compute both the inclination of the vehicle in a longitudinal direction and that in a lateral direction with a high degree of accuracy.

Because the vehicle inclination detecting device 1 according to any of above-mentioned Embodiments 1 to 17 provides an advantage of being able to detect the angle of inclination of, the vehicle with a high degree of accuracy even if a wind is blowing or noise or the like occurs, there is no necessity to use a speed sensor and so on in an auxiliary way. The angle of inclination of the vehicle which is determined while the vehicle is travelling by using the conventional method previously explained is not accurate due to the ultrasonic according to the conventional method, it is determined whether the vehicle is travelling or at rest from a measured value from the speed sensor, and the angle of inclination of the vehicle is measured while the vehicle is at rest. Further, because an error occurs also in the measured value of the speed sensor due to wheel slipping, skidding, etc., the accuracy of the angle of inclination gets worse. In contrast with this, because the vehicle inclination detecting device in accordance with the present invention uses a radio wave having a higher level of noise-proof performance than ultrasonic waves, etc., and also uses a frequency which can express the angle of inclination of the vehicle by using a phase difference of the radio wave suitable for the determination of the angle of inclination of the vehicle, the vehicle inclination detecting device can detect the angle of inclination of the vehicle with a high degree of accuracy without using a speed sensor.

Further, a system that automatically carries out optical axis control of the headlights of the vehicle on the basis of the information about the angle of inclination of the vehicle which the vehicle inclination detecting device 1 in accordance with any of above-mentioned Embodiments 1 to 17 determines can be constructed. For example, in a case in which a vehicle state determining unit for determining whether the vehicle is in a travelling state or in a rest state from a time variation in the phase, a road surface state determining unit for detecting a local uneven spot of the road surface from a time variation in the angle of inclination of the vehicle computed by the angle of inclination arithmetic unit, and an output signal computing unit for outputting a result of correcting the angle of inclination by using both the result of the determination by the vehicle state determining unit and the result of the detection by the road surface state determining unit are added to the vehicle inclination detecting device, the optical axes of the headlights of the vehicle can be adjusted with the corrected angle of inclination.

While the invention has been described in its preferred embodiments, it is to be understood that, in addition to the above-mentioned embodiments, an arbitrary combination of two or more of the embodiments can be made, various changes can be made in an arbitrary component according to any one of the embodiments, and an arbitrary component according to any one of the embodiments can be omitted within the scope of the invention.

INDUSTRIAL APPLICABILITY

As mentioned above, because the vehicle inclination detecting device in accordance with the present invention computes the angle of inclination of a vehicle with a high degree of accuracy without being affected by the surrounding environment, the vehicle inclination detecting device is suitable for use in a system that automatically carries out optical axis control of headlights used for car, and so on.

EXPLANATIONS OF REFERENCE NUMERALS

1 vehicle inclination detecting device, 100 and 1600 transmitting unit, 101 oscillator, 102 amplifier, 103, 1201, and 1505 transmitting antenna, 200, 1700, and 1800 receiving unit, 201, 202, 1202, 1203, and 1501 to 1504 receiving antenna, 203 and 204 amplifier, 300 and 1900 angle of inclination arithmetic unit, 301 amplitude phase computing unit, 302 angle of inclination computing unit, 401 to 404 propagation path, 501 phase shifter, 502 gain control unit, 601 to 604 switching unit, 701 and 702 orthogonal detector, 801 code signal generator, 802 modulator, 803 and 804 correlation computing unit, 901 pulse signal generator, 902 sampling unit, 1301, 1401, 2001, and 2101 straight line, 1302, 1402, 2002, and 2102 dashed line, 2103 dotted line, L1 to L4 path length.

The invention claimed is:
1. A vehicle inclination detecting device comprising:
a transmitting unit disposed in a vehicle, for emitting a transmission signal which is acquired by rotating a phase of an oscillating signal having a predetermined frequency as a radio wave from a transmitting antenna;
a first switching unit for alternately switching between a first received signal which a first receiving antenna acquires by receiving said radio wave reflected from a ground surface and a second received signal which a second receiving antenna acquires by receiving said radio wave reflected from said ground surface to alternately output said first received signal and said second received signal;
a second switching unit for switching between said first received signal or said second received signal from said first switching unit and said transmission signal which said second switching unit acquires from said transmitting unit to alternately output said first received signal or said second received signal and said transmission signal;
an orthogonal detection unit for carrying out orthogonal detection on said first received signal from said second switching unit and said oscillating signal and carrying out orthogonal detection on said second received signal from said second switching unit and said oscillating signal to alternately get a first amplitude and a first phase and a second amplitude and a second phase, and for carrying out orthogonal detection on said transmission signal from said second switching unit and said oscillating signal to get a third amplitude and a third phase; and
an angle of inclination arithmetic unit for referring to phase rotation linearity characteristics of said orthogonal detection unit which are computed from said third amplitude and phase to compute an angle of inclination of said vehicle with respect to said ground surface on a basis of said first amplitude and phase and said second amplitude and phase.

2. The vehicle inclination detecting device according to claim 1, wherein the transmitting unit carries out pulse modulation on the oscillating signal, and the angle of inclination arithmetic unit computes the angle of inclination by using both a value which said angle of inclination arithmetic unit acquires by separating a reflected radio wave reflected once from reflected radio waves each reflected two or more times and then sampling the first amplitude and phase in time sequence, and a value which said angle of inclination arithmetic unit acquires by separating said reflected radio wave reflected once from said reflected radio waves each reflected two or more times and then sampling the second amplitude and phase in time sequence.

3. The vehicle inclination detecting device according to claim 1, wherein the oscillating signal has different frequencies in a time-division way, and the angle of inclination arithmetic unit computes the angle of inclination by using a linear approximation from phase differences based on said different frequencies.

4. The vehicle inclination detecting device according to claim 1, wherein said vehicle inclination detecting device includes three or more receiving antennas, and computes the angle of inclination of the vehicle in a longitudinal direction and the angle of inclination of the vehicle in a lateral direction.

5. A vehicle inclination detecting device comprising:
a transmitting unit disposed in a vehicle, for emitting a transmission signal which is acquired by rotating a phase of an oscillating signal having a predetermined frequency as a radio wave from an transmitting antenna;
a first switching unit for switching between a first received signal which a first receiving antenna acquires by receiving said radio wave reflected from a ground surface and said transmission signal which said first switching unit acquires from said transmitting unit to alternately output said first received signal and said transmission signal;
a second switching unit for switching between a second received signal which a second receiving antenna acquires by receiving said radio wave reflected from said ground surface and said transmission signal which said second switching unit acquires from said transmitting unit to alternately output said second received signal and said transmission signal;
a first orthogonal detection unit for carrying out orthogonal detection on said first received signal from said first switching unit and said oscillating signal to get a first amplitude and a first phase, and carrying out orthogonal detection on said transmission signal from said first switching unit and said oscillating signal to get a third amplitude and a third phase;
a second orthogonal detection unit for carrying out orthogonal detection on said second received signal from said second switching unit and said oscillating signal to get a second amplitude and a second phase, and carrying out orthogonal detection on said transmission signal from said second switching unit and said oscillating signal to get a fourth amplitude and a fourth phase; and
an angle of inclination arithmetic unit for referring to both phase rotation linearity characteristics of said first orthogonal detection unit which are computed from said third amplitude and phase, and phase rotation linearity characteristics of said second orthogonal detection unit which are computed from said fourth amplitude and phase to compute an angle of inclination of said vehicle with respect to said ground surface on a basis of said first amplitude and phase and said second amplitude and phase.

6. A vehicle inclination detecting device comprising:
a transmitting unit disposed in a vehicle, for carrying out pulse modulation on an oscillating signal having a predetermined frequency to emit said oscillating signal as a radio wave from a transmitting antenna;
a switching unit for alternately switching between a first pulse received signal which a first receiving antenna acquires by receiving said radio wave reflected from a ground surface and a second pulse received signal which a second receiving antenna acquires by receiving said radio wave reflected from said ground surface to alternately output said first pulse received signal and said second pulse received signal;
an orthogonal detection unit for carrying out orthogonal detection of said first pulse received signal or said second pulse received signal from said switching unit and said oscillating signal to alternately get a first amplitude and a first phase, and a second amplitude and a second phase; and
an angle of inclination arithmetic unit for computing an angle of inclination of said vehicle with respect to said ground surface on a basis of both a value which said angle of inclination arithmetic unit acquires by separating a reflected radio wave reflected once from reflected radio waves each reflected two or more times and then sampling said first amplitude and first phase in time sequence, and a value which said angle of inclination arithmetic unit acquires by separating said reflected radio wave reflected once from said reflected radio waves each reflected two or more times and then sampling said second amplitude and second phase in time sequence.

7. The vehicle inclination detecting device according to claim 6, wherein in the sampling, by acquiring the first amplitude and the first phase and the second amplitude and the second phase while sliding a sample position of the first amplitude and the first phase and the second amplitude and the second phase, said first amplitude and said first phase and the second amplitude and the second phase are equivalently acquired in time sequence.

8. A vehicle inclination detecting device comprising:
a transmitting unit disposed in a vehicle, for carrying out pulse modulation on an oscillating signal having a predetermined frequency to emit said oscillating signal as a radio wave from a transmitting antenna;
a first orthogonal detection unit for carrying out orthogonal detection on a first pulse received signal which a first receiving antenna acquires by receiving said radio wave reflected from a ground surface and said oscillating signal to acquire a first amplitude and a first phase;
a second orthogonal detection unit for carrying out orthogonal detection on a second pulse received signal which a second receiving antenna acquires by receiving said radio wave reflected from said ground surface and said oscillating signal to acquire a second amplitude and a second phase; and
an angle of inclination arithmetic unit for computing an angle of inclination of said vehicle with respect to said ground surface on a basis of both a value which said angle of inclination arithmetic unit acquires by separating a reflected radio wave reflected once from reflected radio waves each reflected two or more times and then sampling the first amplitude and phase in time sequence, and a value which said angle of inclination arithmetic unit acquires by separating said reflected radio wave reflected once from said reflected radio waves each reflected two or more times and then sampling the second amplitude and phase in time sequence.

* * * * *